(12) United States Patent
Guo et al.

(10) Patent No.: US 7,158,990 B1
(45) Date of Patent: Jan. 2, 2007

(54) METHODS AND APPARATUS FOR DATA CONVERSION

(75) Inventors: Dongbai Guo, Nashua, NH (US); Ian Stocks, Londonderry, NH (US); Susan Mavris, Bedford, NH (US)

(73) Assignee: Oracle International Corporation, Redwood Shores, CA (US)

( * ) Notice: Subject to any disclaimer, the term of this patent is extended or adjusted under 35 U.S.C. 154(b) by 497 days.

(21) Appl. No.: 10/161,161

(22) Filed: May 31, 2002

(51) Int. Cl.
*G06F 17/30* (2006.01)
*G06F 15/16* (2006.01)

(52) U.S. Cl. ............. 707/102; 707/100; 709/203; 715/513

(58) Field of Classification Search ............ 707/1, 707/10, 100, 102, 104.1; 704/6; 709/203; 715/513, 522; 719/310; 725/51
See application file for complete search history.

(56) References Cited

U.S. PATENT DOCUMENTS 6,480,860 B1 * 11/2002 Monday ............... 707/102

6,782,379 B1 * 8/2004 Lee ..................... 707/2

OTHER PUBLICATIONS

Norma Ramsey, et al., "The New Jersey Machine-Code Toolkit", in: 1995 USENIX Technical Conference, Jan. 16-20, 1995, New Orleans, LA, 289-302.

* cited by examiner

*Primary Examiner*—Jeffrey Gaffin
*Assistant Examiner*—Hassan Mahmoudi
(74) *Attorney, Agent, or Firm*—Gordon E. Nelson

(57) ABSTRACT

A data format description from which encoders and decoders can be automatically generated. The data format description includes data components that represent a field of the data object as a description of the field and a tag. On decoding, the decoder decodes the field's value and produces an XML element that contains the value and the tag from the data component. On encoding, the encoder uses the tag to locate the XML element and encodes the value in the data object. Also included in the data format description are attributes and control statements An object, its XML representation, and the encoders and decoders may be combined to produce self-describing data objects in which a modification of the XML representation automatically results in a modification of the data object.

34 Claims, 19 Drawing Sheets

```
                                      404
403{elem AuFormat
       { 405
              409         411   413         415              419
       407 data magicNumber {attr value={0x2e736e64}; is int ;}

423
       421 data audioDataOffset {attr constraint=
               {${audioDataOffset}>=24}; is int;}
                           425

427 data audioDataSize {is int;}

429 data audioDataFormat{attr constraint=
               {(${audioDataFormat}>0&&
               ${audioDataFormat}<28)}; is int;}

431 data samplingRate {is int; }

433 data channelCount {is int;}

436
       435 data audioFileInfo{attr length=
               {${audioDataOffset}-24};is string;}

439
       437 data audioData{attr repeat={${audioDataSize}},
               endwith={"%EOD"}, xmlpresence={"never"}; is int;}
       } 405      440                 441
} 403

```
< ?xml version="1.0"?>
< !- Generated with Data Format Declaration Interface -->                503
<AuFormat> 505
      <magicNumber dataType="java.lang.Integer">           509
      <![CDATA[779316836]]></magicNumber>
                511
   <audioDataOffset dataType="java.lang.Integer">
513  <![CDATA[24]]></audioDataOffset>
   <audioDataSize dataType="java.lang.Integer">
      <![CDATA[245460]]></audioDataSize>
   <audioDataFormat dataType="java.lang.Integer">           515
      <![CDATA[1]]</audioDataFormat>
   <samplingRate dataType="java.lang.Integer">
      <![CDATA[22255]]></samplingRate>
   <channelCount dataType="java.lang.Integer">
      <![CDATA[1]]></channelCount>
   <audioFileInfo dataType="java.lang.String">
      <![CDATA[]]></audioFileInfo>
   <dataFormatDescription dataType="java.lang.String">
      <![CDATA[Next/Sun audio file format]] >
      </DataFormatDescription>
   <dataFormatCode dataType="java.lang.String">
      <![CDATA[AUFF]]></dataFormatCode>              517
   <mimeType dataType="java.lang.String">
      <![CDATA[audio/basic]]></mimeType>
</AuFormat>
      505
```

```
import oracle.ord.dfm.*;  603 public class AuFormatHandler implements Decoder, Encoder  605
{
  private DfmDataElement AuFormat;
  private DfmDataFilter filter;                              607
  private DfmEngine eng;

public AuFormatHandler( DfmEngine e)
      throws DfmElementInitException
    {                                                        609
    eng = e;
    filter = eng.getDfmDataFilter();
    AuFormat= new DfmDataElement("AuFormat");
    } public void decode(SeekableInput  data_source,          611
                   DecoderCallback input_redirection,
                   ErrorCallback err_handler,
                   XMLDocument output)
    {
      // decode code here--see FIG. 7
    } public void encode( XMLDocument data_source,            613
    {                   EncoderCallback output_redirection,
                        ErrorCallback err_handler,
                        SeekableOutput output)
601    //encode code here
    }
}
```

FIG. 6

```
public void decode(SeekableInput  src,
                   DecoderCallback input_redirection, 701
                   ErrorCallback err_handler,
                   XMLDocument dst)
{
DfmDocument docinstance= null;   703
try 705
{
   docinstance= AuFormat.createInstance();   ⎫ 707
   docinstance.init();                       ⎭
   DataElement elem0= new DataElement();  708
   elem0.setName("AuFormat");

int tmp00=filter.decodeInt(src);   711
   if (!(tmp00 == 779316836))         713
      throw new InconsistentDataValueException    715
      ( docinstance.getDescription()+ "magicNumber" );       709
   elem0.addDataComponent("magicNumber",  717
     DataType::INT, tmp00);

int tmp01=filter.decodeInt(src);
   if ( !(tmp01>=24))
      throw new ConstraintViolationException
      ( docinstance.getDescription() + "audioDataOffset" );
   elem0.addDataComponent("audioDataOffset",
     DataType::INT,tmp01);
   int tmp02=filter.decodeInt(src);
   elem0.addDataComponent("audioDataSize",DataType::INT, tmp02);
   int tmp03=filter.decodeInt(src);
   if (!((tmp03>0) && (tmp03/28)))
      throw new ConstraintViolationException
         (docinstance.getDescription() + "audioDataFormat" );
   elem0.addDataComponent("audioDataFormat",
     DataType::INT, tmp03);
   int tmp04=filter.decodeInt(src);
   elem0.addDataComponent("samplingRate", DataType::INT, tmp04);
   int tmp05=filter.decodeInt(src);
   elem0.addDataComponent("channelCount", DataType::INT, tmp05);
   String tmp06=null;
   int tmp07= tmp01 - 24;
   tmp06 = filter.decodeString(src, tmp07);    719
   elem0.addDataComponent("audioFileInfo",
     DataType::STRING, tmp06);
   docinstance.addDataElement(elem0); 721
   docinstance.exportToXml(dst);   723
}
catch (Exception e) {} 705
}
 611
```

FIG. 7

$$DFD := \{ ( elementDef )- \} \tag{1}$$
$$elementDef := \textbf{elem}\ [stringExpr]\ \{\ [\textbf{attr}\ attributeList;\ ]\ dataStatement\ \} \tag{2}$$
$$dataStatement := (\ comment\ |\ declare\ |\ assign\ |$$
$$\qquad control\ |\ dataDef\ |\ elementDef\ )+ \tag{24}$$
$$dataDef := \textbf{data}\ [stringExpr]\ \{\ [\textbf{attr}\ attributeList;]$$
$$\qquad \textbf{like}\ stringExpr\ |$$
$$\qquad \textbf{is}\ stringExpr\ |\ elementDef\ \} \tag{A}$$
$$attributeList := attribute\ [\ ,\ attributeList\ ] \tag{B}$$
$$attribute := (\ occurrenceAttr\ |\ orderAttr\ |\ binpresenceAttr\ |$$
$$\qquad xmlpresenceAttr\ |\ constraintAttr\ |\ addressAttr\ |$$
$$\qquad alignmentAttr\ |\ packingAttr\ |\ endianAttr\ |$$
$$\qquad bitorderAttr\ |\ endwithAttr\ |\ repeatAttr\ |$$
$$\qquad lengthAttr\ |\ valueAttr\ |\ formatAttr\ |\ processingAttr\ |$$
$$\qquad accessAttr\ |\ hintAttr\ |\ inputredirectionAttr\ |$$
$$\qquad outputredirectionAttr\ |\ errorbehaviorAttr\ ) \tag{C}$$
$$bitLenExpr := intExpr\ [.\ intExpr\ ] \tag{4}$$

1101A

FIG. 11A $occurrenceAttr ::= \textbf{occurrence} = \{ stringExpr \}$     (5)

$orderAttr ::= \textbf{order} = \{ stringExpr \}$     (6)

$binpresenceAttr ::= \textbf{binpresence} = \{ stringExpr \mid conditionExpr \}$     (7a)

$xmlpresenceAttr ::= \textbf{xmlpresence} = \{ stringExpr \mid conditionExpr \}$     (7b)

$constraintAttr ::= \textbf{constraint} = \{ conditionExpr \}$     (8)

$addressAttr ::= \textbf{address} = \{ bitLenExpr\; [: bitLenExpr] \}$     (9)

$alignmentAttr ::= \textbf{alignment} = \{ bitLenExpr\; [; stringExpr] \}$     (10)

$packingAttr ::= \textbf{packing} = \{ stringExpr \}$     (11)

$endianAttr ::= \textbf{endian} = \{ stringExpr \}$     (12)

$bitorderAttr ::= \textbf{bitorder} = \{ stringExpr \}$     (13)

$endwithAttr ::= \textbf{endwith} = \{ stringExpr \}$     (14)

$repeatAttr ::= \textbf{repeat} = \{ intExpr\; [; identifier] \}$     (15)

$lengthAttr ::= \textbf{length} = \{ bitLenExpr \}$     (16)

$valueAttr ::= \textbf{value} = \{ expr \}$     (17)

$formatAttr ::= \textbf{format} = \{ stringExpr \}$     (18)

$processingAttr ::= \textbf{processing} = \{ stringExpr \}$     (19)

$accessAttr ::= \textbf{access} = \{ stringExpr \}$     (20)

$hintAttr ::= \textbf{hint} = \{ ( identifier = stringExpr\; ; )+ \}$     (21)

$inputredirectionAttr ::= \textbf{inputredirection} = \{ stringExpr \}$     (D)

$outputredirectionAttr ::= \textbf{outputredirection} = \{ stringExpr \}$     (22)

$errorbehaviorAttr ::= \textbf{errorbehavior} = \{ stringExpr \}$     (23)

FIG. 11B

```
comment := # characters                                              (25)
declare := bit | int | string | bool identifier;                     (26)
assign := identifier = expr ;                                        (27)
control := ifStatement | whileStatement | switchStatement            (28)
ifStatement := if ( conditionExpr ) { dataStatement }
               [else { dataStatement }; ]                            (29)
whileStatement := while ( conditionExpr ) { dataStatement };         (30)
switchStatement := switch ( identifier ) { ( caseStatement ) +
               [ defaultStatement ] };                               (31)
caseStatement := case expr : { dataStatement [break;] }              (32)
defaultStatement := default : { dataStatement }                      (33)
expr := bitExpr | stringExpr | intExpr | condExpr                    (34)
addressofExpr := @{ stringExpr }                                     (35)
valueofExpr := ${ stringExpr }                                       (36)
bitExpr := bitExpr [ (& | | | ^ ) bitExpr1 ]                         (37)
bitExpr1 := bitExpr1 [ (<< | >> ) intExpr ]                          (E)
bitExpr2 := [~] primary                                              (F)
intExpr := intExpr [ ( + | - ) intExpr1 ]                            (38)
intExpr1 := intExpr1 [ ( * | / | % ) intExpr2 ]                      (G)
intExpr2 := [-] primary                                              (H)

stringExpr := stringExpr [ + primary ]                               (39)
condExpr := condExpr [ (&& | || ) condExpr1 ]                        (40)
condExpr1 := ( intExpr ( == | != | < | > | <= | >= ) intExpr |
             stringExpr ( == | != | < | > | <= | >= ) stringExpr |
             [!] primary )                                           (I)
primary := valueofExpr | addressofExpr | (expr) | literal |
             function | identifier | identifier ( intExpr [: [ intExpr ] ] )   (J)
function := identifier ( [ expr [ (, expr)+ ] ] )                    (K)
```

FIG 11C

```
public void encode(XMLDocument src,
                   EncoderCallback output_redirection,
                   ErrorCallback err_handler,
                   SeekableInput  dst)
{
DfmDoc docinstance= null;
try
{
  docinstance= AuFormat.createInstance();
  docinstance.init(src);
  DataElement elem0= new docinstance.getDataElement();
  elem0.setName("AuFormat");
  int tmp00=elem0.getDataComponentInt("magicNumber");
  if (!(tmp00 == 779316836))
    throw new InconsistentDataValueException(
      docinstance.getDescription()+ "magicNumber" );
  filter.encodeInt(dst, tmp00);
  int tmp01=elem0.getDataComponentInt("audioDataOffset");
  if ( !(tmp01 >=24))
    throw new ConstraintViolationException(
      docinstance.getDescription() + "audioDataOffset" );
  filter.encodeInt(dst, tmp01);
  int tmp02=elem0.getDataComponentInt("audioDataSize");
  filter.encodeInt(dst, tmp02);
  int tmp03=elem0.getDataComponentInt("audioDataFormat");
  if ( !( (tmp03>0) && (tmp03 < 28)) )
    throw new ConstraintViolationException(
      docinstance.getDescription() + "audioDataFormat" );
  filter.encodeInt(dst, tmp03);
  int tmp04=elem0.getDataComponentInt("samplingRate");
  filter.encodeInt(dst, tmp04);
  int tmp05=elem0.getDataComponentInt("channelCount");
  filter.encodeInt(dst, tmp05);
  String tmp06=elem0.getDataComponentString(
    "audioFileInfo");
  int tmp07= tmp01 - 24;
  tmp06 = filter.encodeString(src, tmp06, tmp07);
}
 catch (Exception e) {}
}
```

METHODS AND APPARATUS FOR DATA CONVERSION

CROSS REFERENCES TO RELATED APPLICATIONS

Not Applicable

BACKGROUND OF THE INVENTION

1. Field of the Invention

The invention relates generally to conversion of data objects from one data format to another data format and more specifically to techniques for dealing with the proliferation of data formats.

2. Description of Related Art

At the most basic level, the memory devices in a computer system are nothing but pools of bits and the networks that connect computer systems are nothing but streams of bits. The bits in a particular data object can only be correctly interpreted if the object's data format is known. The format is what determines where the data object begins, where it ends, how it is divided into fields of bits, and how these fields are to be interpreted. Thus, in order for a computer system to deal with a particular data object, there must be a program in the computer system that "knows" the format in the sense that the program can interpret the particular data object according to the object's data format. In the following, a program that is able to interpret a particular data object according to the object's data format is termed a data format handler.

FIG. 1 is an overview 101 of a typical data format handler 105. This particular data format handler 105 converts between a data object 113 having a particular data format "A" and a data object 103 having another data format. The actual bits of data objects 113 and 123 are accessed by library functions. There are two sets of such functions: data stream write library functions 108, which write bits to data object 113 and data object 103 and data stream read library functions 109, which read bits from object 113 and data object 103. Data format handler 105 converts in two directions: from data object 113 to data object 103 and vice-versa. The conversion from data object 113 to data object 103 is a decoding operation and is done by decoder 111; the conversion from data object 103 to data object 113 is an encoding operation and is performed by encoder 107; in other cases, of course, data format handler 105 may convert in only one direction. While the data stream libraries operate at the bit level and may therefore typically be reused in many different data format handlers 105, the encoder and decoder must be written anew for each pair of data formats. Of course, each time one of the pair of formats changes, the format handler 105 must be rewritten to take the change into account.

What a computer system does in general is read a data object from memory, operate on the data object, and write it back to memory. What this means, of course, is that virtually every program uses data format handlers—first to read data objects from memory, and then to write the results of the processing as data objects back to memory. Every operating system has native data handlers that handle the primitive kinds of data objects recognized by the operating system. Other programs use the operating system's native data handlers and in addition have data format handlers that are native to the particular program to handle the primitive kinds of data objects manipulated by those programs. A relational database system, for example, uses table data objects to organize other data objects into tables having rows and columns and accordingly has native data handlers for tables. However, the relational database system not only needs native data format handlers to handle its tables, but also needs data format handlers for the data formats of all of the objects organized by the tables.

In the past, the approach taken to writing data format handlers was to hand-write a new data format handler for each new pair of data formats. Even in the days when data formats were relatively few and relatively simple, writing data format handlers was a major part of the effort involved in writing most programs. As the world has gone digital, the need to write a new data format handler for each new pair of data formats has become a larger and larger bottleneck. There has been an explosive increase in the number of data formats, and many of them are constantly evolving.

Keeping up with the task of providing data format handlers for new and evolving data formats has been a particular problem for the manufacturers of database systems. The purpose of a database system is to permit a user to access data objects stored in the database system on the basis of the values of other data objects stored in the database system, and in order to do so, the database system must be able to interpret those objects. Because this is so, the database system can only incorporate those data objects into its tables for which it has data format handlers. As the number of data object formats and the speed with which new or altered formats have developed have increased, it has become more and more difficult for the makers of database systems to provide data format handlers in a timely fashion.

The proliferation of data formats has caused other problems for the makers of database systems as well. One of them is simply keeping track of the data format handlers available for use in a database system; another is constructing the data format handlers in such a fashion that one data format handler may easily use another data format handler to deal with a data format that is contained within the data format being handled by the first data format handler; another is providing a common data format into which a data object of any given data format can be converted and from which a data object can be converted to the given format. A final problem is the metadata that the database system uses internally to describe the data objects organized in its tables. Each different data format of course requires its own metadata, and the database system must be able not only to obtain the metadata from objects having the data format but also to correctly interpret it. It is an object of the techniques disclosed herein to solve the above and other problems related to the proliferation of data formats.

SUMMARY OF THE INVENTION

In summary, the solutions to the problems include the following:

A solution to the efficient generation of encoders and decoders for data objects is a data format description from which a data processing system automatically produces an encoder and/or a decoder that converts between a first data object having at least one field and a second data object having at least one element. The data format description includes one or more data components. Each data component includes at least a description of the field and mapping information associated with the description. The decoder produces a value from the field and makes a corresponding element which includes the value and the mapping information. The encoder uses the element's mapping information to locate the element in the second data object and produces the field from the element's value.

The data components are nested in data format description elements. A data format description element is also associated with mapping information and the description of the field in a data component may be the mapping information for a data format description element. The mapping information associated with the nested data components and data format description elements forms a hierarchy of mapping information. An item of mapping information must be unique when fully qualified by its ancestors in the hierarchy of mapping information.

Both data format description elements and data components may be associated with attributes that specify properties of data components. The attributes in a format description element apply to the format description element's contained data components unless they are overridden by corresponding attributes in the data components. A data format description element may also contain a control statement that determines an order in which the encoder or decoder performs the encoding or decoding operations specified by the data components. Both the attributes and the control statements may include expressions whose value is computed during execution of the encoder or decoder. The expressions may specify a value found at a location in a field or element specified by an item of mapping information or the location in the binary stream of a field or element specified by the item of mapping information.

Attributes include attributes that specify constraints on field or element values, attributes that specify the form of a component of a binary stream, attributes that specify the content of the binary stream, attributes that specify whether a value in the first object will become an element in the second and whether the value from an element of the first object will be present in the second data object, and attributes that specify how the encoder or decoder is to process the field or attribute in addition to decoding or encoding. The additional processing may include invoking callbacks that are associated with the encoder or decoder.

Another solution to the problem of efficiently producing encoders and decoders is apparatus that generates an encoder and/or decoder that converts between a first data object having at least one field and a second data object having at least one element. The apparatus generates the encoder and/or the decoder in response to a data format description that includes a description of the field and mapping information associated with the description. The decoder produces a value from the field and makes the element, which includes the value and the mapping information. The encoder uses the element's mapping information to locate the element and produces the field from the value. Conversion between field and element and vice-versa is without loss of information belonging to the field. In one embodiment, the second object is an XML object and the mapping information is an XML element name that is employed in the encoder and the decoder to map the field in the data object to a corresponding element in the XML object.

The problem of providing metadata for an object is solved with a self-describing data object. The self-describing data object includes the data object, a representation of the data object that includes mapping information that establishes a mapping between the data object and the representation, a decoder that produces the representation from the data object and an encoder that uses the mapping information to produce the data object from the representation. The representation, the encoder, and the decoder are all associated with the data object and the encoder automatically produces the data object in response to a modification of the representation. Conversion between a field of the data object and an element of the representation and vice-versa is without loss of information belonging to the field. In one embodiment, the representation is an XML object and the mapping information is an XML element name that is employed in the encoder and the decoder to map a field in the data object to an element in the XML object.

Other objects and advantages will be apparent to those skilled in the arts to which the invention pertains upon perusal of the following Detailed Description and drawing, wherein:

BRIEF DESCRIPTION OF THE DRAWING

FIG. 4 is a data format description of the AU format;

FIG. 5 is an object having the XML format that was made from an object having the AU format;

FIG. 6 is an overview of Java code for an automatically-produced data format handler;

FIG. 7 is the Java code for a decoder for objects having the AU format;

FIG. 11A is a first part of the BNF for the DFD language;

FIG. 11B is a second part of the BNF for the DFD language;

FIG. 11C is a third part of the BNF for the DFD language;

FIG. 16 is the Java code for an encoder for objects having the Au format;

Figure 1:
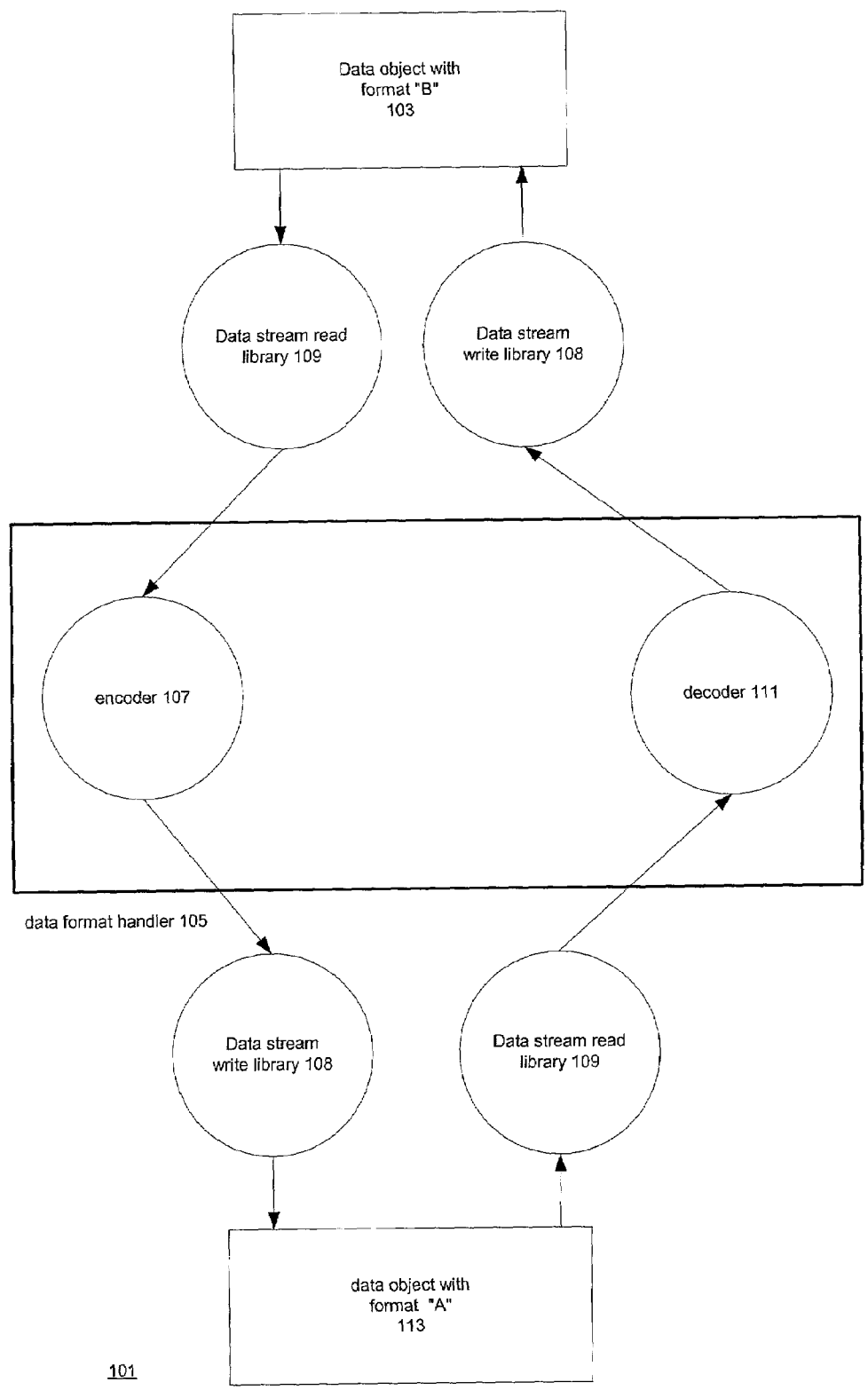
FIG. 1 is an overview of a prior-art hand-made data format handler.

Reference numbers in the drawing have three or more digits: the two right-hand digits are reference numbers in the drawing indicated by the remaining digits. Thus, an item with the reference number 203 first appears as item 203 in FIG. 2.

DETAILED DESCRIPTION

The following Detailed Description will first disclose a system for automatically producing a data format handler from a description of a data format, will then show how a registry of data format handlers may be employed to simplify data conversions, will then show how in a system where the data format handlers convert between various data formats and the XML data format, the version of a data object in XML format may be employed as metadata for a version of the data object in another format. Finally, the language used to describe the data formats in the preferred embodiment will be disclosed in detail.

Figure 2:
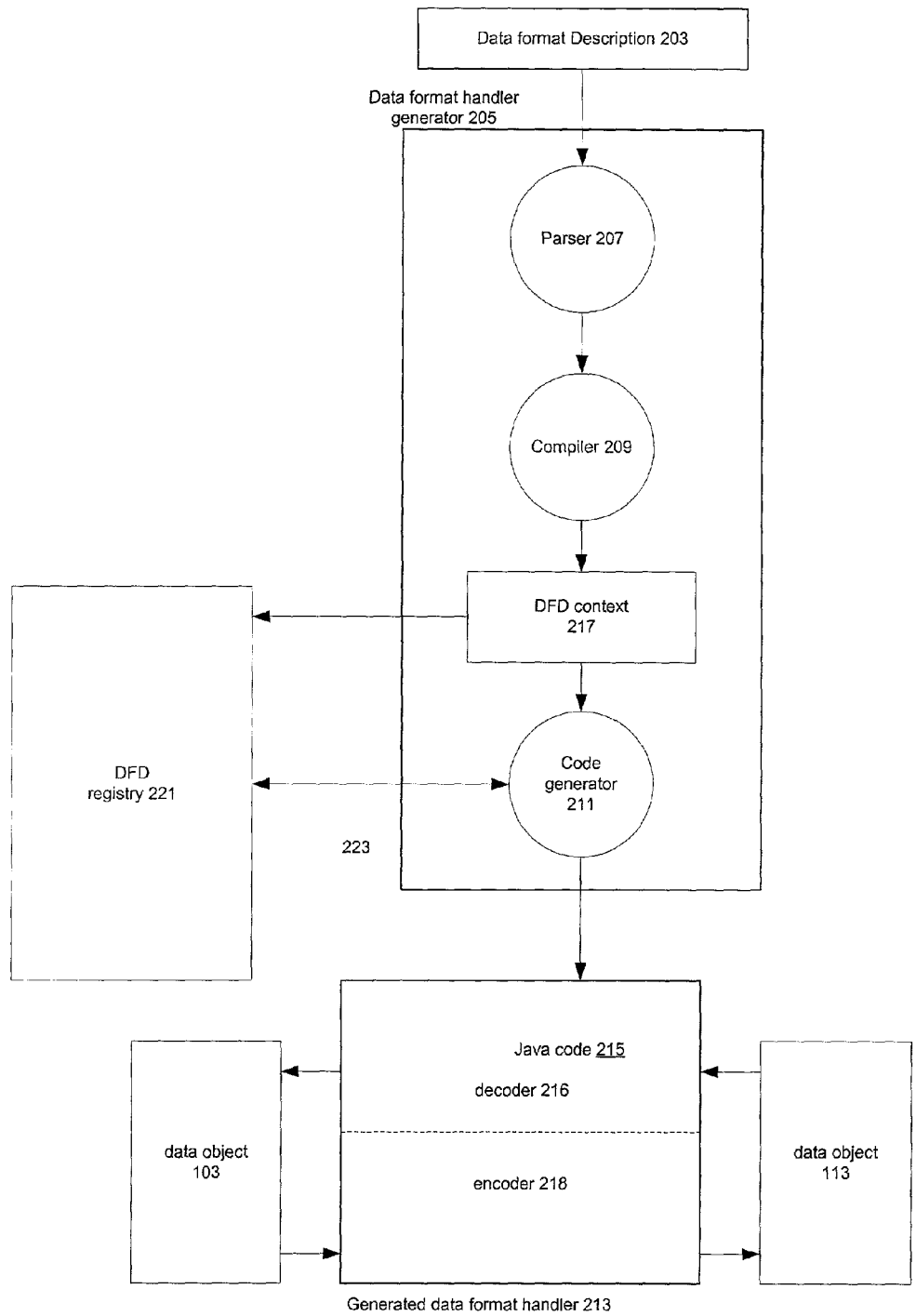
FIG. 2 is an overview of a system for automatically producing a data format handler from a data format description.

Automating the Production of Data Format Handlers: FIG. 2

FIG. 2 shows at 201 data format handler generator 205 and its inputs and outputs. Data format handler generator 205 is a program that executes in a computer system. It takes as its input a data format description 203 which is stored in the computer system and produces as its output a generated data format handler 213 which contains the components shown in FIG. 1.

Data format description 203 is a description of a data format which is precise enough so that data format handler generator 205 can generate data format handler 213 from it. Data format description 203 may either be produced directly, by writing in a data format description language which will be explained in more detail in the following, or indirectly, for example by manipulating graphical elements representing components of a data format in a graphical user interface until they describe the data format and then producing data format description 203 from the positions and relationships to each other of the graphical elements. The data description language used to describe data formats in a preferred embodiment will be disclosed in detail later.

Data format handler generator 205 employs well-known program generator techniques such as are described in the standard textbook A. V. Aho, R. Sethi, and J. D. Ullman. *Compilers: Principles, Techniques and Tools*. Addison-Wesley, 1986. Such program generators are generally built by first defining a language for describing the entities that the programs generated by the program generators operate on and then employing well-known techniques for constructing a parser to parse the language, a compiler to organize the entities found by the parser in a way such that code can be generated from them, and a code generator to generate the code itself. The code may be anything from machine-executable code through code in a high-level language, depending on the application. Data format handler generator 205 has the usual components: a parser 207, a compiler 209, and a code generator 211. In this case, the code generated by code generator 211 is in the Java™ programming language. Java code may be executed by the Java interpreter that is a component of most modern computer systems. Generated data format handler 213 has a decoder 216 and an encoder 218, both in Java code 215. As shown in FIG. 2, decoder 216 converts data object 113 to data object 103 and encoder 218 converts data object 103 to data object 113. A characteristic of a preferred embodiment of system 201 is that generated data format handler 213 can convert between data object 113 and data object 103 and without loss of information, i.e., if a first data object 113 is converted to data object 103 and data object 103 is then converted to a second data object 113, the first and second data objects 113 are identical.

An important feature of a preferred embodiment of generated data format handler 213 is context 217, which is produced by compiler 209 from DFD 203 and contains all of the information that code generator 211 requires to generate decoder 216 and encoder 218. Most of the information is from DFD 203, but context 207 also includes global information required to generate objects and encoders and decoders for the system in which the encoders and decoders will operate. An example of this global information is information which is not available from data object 113 but must be present in every data object 103. Information from context 217 is further stored permanently in DFD registry 221, where it is available to users of the system in which the encoder and decoder operate and to code generator 211, as shown at 223. One class of information that is stored in DFD registry 221 is externally visible names from DFDs 203 and the locations of the entities the names refer to. An important feature of generated data format handler 213 in a preferred embodiment is that it converts data objects having the data format described in data format description 203 to and from the well-known XML data format.

Figure 3:
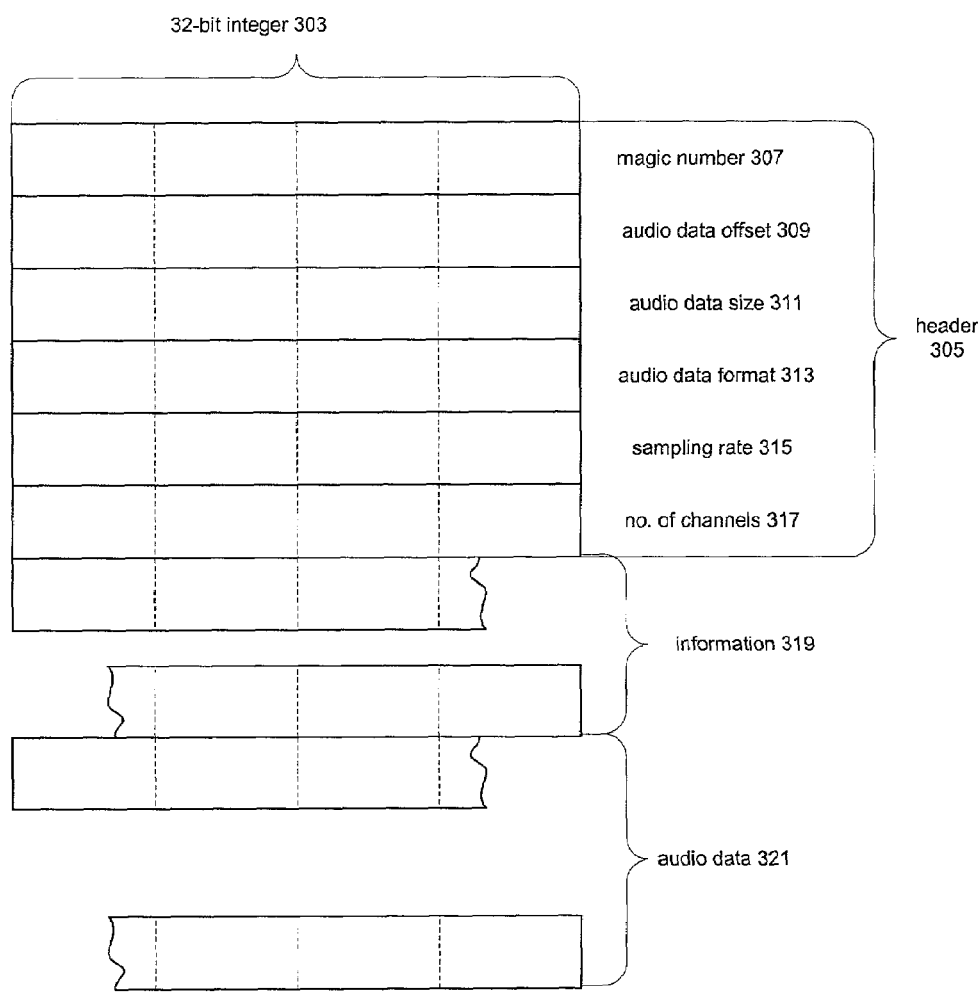
FIG. 3 is an overview of the AU data format.

Example of the Operation of Data Format Handler Generator 205: FIGS. 3–5

The following example will show how data format handler generator 205 can be used to generate a data format handler for a data format called AU that is used with UNIX operating systems to represent audio data. FIG. 3 shows the format. AU data format 301 has three main parts: a header 305 made up of 6 fields, each of which is a 32-bit (4 byte) integer word, as shown at 303; a varying-length information field 319 that contains character-string data such as the title of the piece represented by the audio and the names of the artists, and a varying-length audio data field 321. Header 305 identifies the format type, important locations in data objects having the format, and the format of the audio data. Beginning with the header's first field, magic number field 307 contains a value which identifies the data object as having the AU data format; audio data offset 309 specifies the offset in bytes in the object at which audio data 321 begins; the offset must be more than 24 bytes. Audio data format 313 specifies the manner in which the audio data is encoded; the format must have a value between 1 and 27; sampling rate field 315 contains an integer value that specifies the sampling rate at which the audio data was made; no. of channels 317, finally, indicates the number of channels represented in the audio data.

FIG. 4 shows an example data format description 203. Example data format description 203 describes AU data format 301 and is written in the data format description language employed in the preferred embodiment. In the language, a data format description consists of a list of one or more elements 403, each identified by the keyword elem; here, there is one such element, whose beginning and end are indicated by the braces labeled 405. The element has a name, AuFormat, which is indicated by a tag 404 that is visible externally to data format description 203. An element contains a list 405 of data statements; among the kinds of data statements are data defs. A data def is identified by the keyword data and defines a field of the data format being defined; the data format description maps the data defs to the fields of the data format; as will be explained in detail later, the data definition language permits specification of a number of different mappings; here, the default mapping is used, namely, the data defs have the same order in the data description as the fields they describe have in the data format; thus, the first data def, indicated at 407, describes magic number field 307 of AU data format 301. Following the data keyword, there is a tag 409, which in this case is the name in the data description for the field being described by the data def. The rest of the description of the field is in brackets following the keyword; it may include a list of attributes (identified by the attr keyword 411) that describe properties of the field, and following the is keyword, the primitive data type of the field, here, integer, as indicated by int keyword 419. The attribute list in this case includes one attribute, the value attribute that specifies a default value for the field. If the field does not have the value, an exception is thrown. In this case, the default value is the magic number for the AU data format, and consequently, the exception is thrown if the field does not contain the magic number.

Each of the data defs in AU data format 301 has a tag; the AuFormat tag 404 and the tags in the data defs form a tree, with the AuFormat tag being the tree's root and the tags for the data defs being leaves of the tree. In a preferred embodiment, the tag for each element must be unique among the data format descriptions 203 from which a particular data format handler generator 205 generates data format handlers 213. A tagged data statement in a given data format description 203 is uniquely identified by a qualified tag which is a sequence of tags beginning with the tag for the element to which the given data format description belongs and continuing down the tree of tags until the tagged data statement is reached. The tags in the sequence are separated by the "." character. Thus, the qualified tag for magicNumber is AuFormat.magicNumber.

Continuing with the remaining data defs, there is a data def for each field of the format. Data def 421 specifies audio data offset field 309; the attribute there is a constraint 423, which specifies a condition that must be fulfilled when the data def is applied to the field in the data object currently being processed that corresponds to the data def. An important property of the data format definition language of the preferred embodiment is that it can use values contained in the current data object to determine how the current object is to be processed; ${audioDataoffset} indicates the value of audio data offset field 309 in the current object. If the current data object is valid, the audio data must begin after the header, and consequently the value of field 309 in the current object must be >= 24, which is what the constraint attribute checks.

Data def 427 specifies audio data size field 311; data def 429 specifies audio data format field 313; here, the constraint attribute retrieves the value of the audio data format field 313 in the current object and checks to make sure that it has one of the legal values, which range between 1 and 27. Data def 431 specifies sampling rate field 315 and data def 433 specifies no. of channels field 317. Data def field 435 specifies the variable length information field 319; this field has the string primitive type. The fact that the field may be of varying lengths is dealt with by length attribute 436, which uses the current value of the field described by data def 421 to compute the length of information field 319 in the current data object. Data def field 437, finally, specifies audio data field 321. Here, the field's varying length is dealt with by means of repeat attribute 439 and endwith attribute 440. The repeat attribute indicates that data should be fetched from the field being described until some condition is reached; here, endwith indicates the condition, namely, when the data has run out. When that happens is indicated by the value ${audioDataSize}, which of course represents the value of audio data size field 311 in the current data item. The xmlpresence attribute indicates whether the contents of audio data field 321 are to be included in the XML representation of the data object that will be produced by the data format handler generated from description 203. Here, it is not to be included, and thus, the XML representation will contain the AU data object's metadata but not the actual audio data. A data object's metadata is information in the data object that describes the actual contents of the data object, or in this case, information such as the location of the audio data in the object and the manner in which it is encoded.

The format into which Generated Data Format Handler 213 Converts the Data Object: FIG. 5

Data format handler generator 205 may be constructed to generate generated data format handlers 213 that convert data between any pair of data formats; however, in the preferred embodiment, one of the members of the pair of data formats is always the XML data format. The XML data format is an extensible markup language, that is, it permits users to define their own versions of XML for their own purposes; all versions of XML, however, follow the same syntactic rules, and can thus be manipulated by widely-available XML tools. Because XML is both highly flexible and standardized, it has become the data format of choice for data interchange. If one party uses format A for its data and another uses format B, data can be interchanged between them by converting A to XML and XML to B, and vice-versa. For details about XML, see *Extensible Markup Language* (*XML*) 1.0, REC-xml-19980210, W3C Recommendation 10 Feb. 1998.

FIG. 5 shows a data object 501 formatted in XML. XML object 501 was produced by a generated data format handler 213 from a data object having the AU format shown in FIG. 3. Generated data format handler 213 was produced by data format handler generator 205 from data format description 401. In an XML object, elements of the object are enclosed in angle brackets: < and >. Elements may be named and the names may be user-defined. An element may contain another element, which is said to be nested in the containing element; when an element contains another element, the containing element has the form <element_name> at the start of the element and </element_name> following all nested elements. Thus, the element named AUFormat 505 begins with <AUFormat> and ends with </AUFormat>.

At the highest level, data object 501 has elements at 503 that indicate the XML version and a comment. The AUFormat element 505 has nested within it elements 515 representing data in header fields 305 and information field 319 of the AU data object from which the XML data object was made. A comparison with FIG. 4 will show that the XML element name AUFormat and the names for the elements indicated by bracket 515 come from tags in data format description 401 for the AU data format.

The XML element produced by the code in data format handler 213 that was generated from data def 407 of the data format definition is shown at 509. The XML element has the name 409 magicNumber; the data type of the element is defined at 511 as the integer type defined in the Java programming language. < ! [CDATA [ . . . ] ] > in XML indicates that the data item between the square brackets is to be interpreted literally, i.e., as not belonging to the XML language. Here, as shown at 513, the data item is the "magic number" for the AU format. The remaining Java elements indicated by bracket 515 similarly contain the values of header fields 305 and information field 319 for the particular AU format data object being converted. The elements shown at 517 come from data format information that DFD registry 221 indicates is to be associated with generated data format handler 213.

Example Java™ Language Code for a Generated Data Format Handler 215: FIGS. 6, 7, and 16

Data format handler generator 205 may of course generate any kind of code from data format descriptor 203 which is useful in the processing environment in which generated data format handler 213 is to execute. In a preferred embodiment, however, generated data format handler 213's code is code in the well-known Java programming language. For details concerning the Java programming language, see Ken Arnold and James Gosling, *The Java™ Programming Language*, Addison Wesley Longman, Reading, Mass., 1996.

FIG. 6 provides an overview of an example 601 of Java code 215 generated by data format handler generator 205 from data format description 401 for the AU format. Example 601 begins with an import statement 603 that imports definitions of objects in the Oracle database system environment in which generated data format handler 213 will execute. Next comes a class declaration for the class AuFormatHandler, which handles AU formats. AUFormatHandler, like all of the data format handlers produced by data format handler generator 205, is an implementation of a supertype DfmHandler. At 607, three local variables are defined. At 609, the initiation method AuFormatHandler is defined. The method is invoked with an argument e whose value belongs to a global management class that gives access to global instances used in system 201. e is assigned to the local variable eng. The local variable filter is an object whose methods are functions in data stream read library 109 and data stream write library 108. The local variable AuFormat, finally, is an object of class DfmDataElement. Objects of that class all use the methods defined in DfmDataElement for manipulating nodes of a tree generated from the DFD representation. Also included in the AuFormat object is information obtained from registry 221 that is needed to do the encoding and decoding. The rest of code 601 consists of the code 611 for a decode method that decodes an AU data object into an XML object and the code 613 for an encode method that encodes an XML object that represents an AU data object into the AU data object. Details of the code are not shown in FIG. 6.

The complete code for decode method 611 is shown in FIG. 7. As shown at 701, the method takes two arguments: a specification of a source where the AU object may be found and a specification of a destination where the XML object to which the AU object is converted by method 611 may be stored. At 703, method 611 of the AuFormat object creates an empty instance of an object that will hold decoded data until the data can be output as an XML object. try and catch, both labeled 705, set up a try block; any exception that occurs in the block will be handled as specified in the catch. The statements at 707 initialize the empty instance created at 703. Decode function 611 will fill the empty instance with elements that correspond to the elements of XML object 401. The first such element is the one representing <AuFormat> </AuFormat>505. It appears as the variable elem0, whose name is set to AuFormat.

Then, the information needed for the XML representation of each element contained in the AuFormat element 505 is added in turn to elem0. The statements that add the information for the magicNumber part of the XML are shown at 709. At 711, the decodeInt method in data stream read library 109 reads the first integer field in the AU format; the if statement at 713 throws an exception 715 if the value in the field is not the magic number required for the format. If no exception is thrown, the character string magicNumber and the contents of the field are added to elem0, as shown at 717. The character string is of course the name of the XML element 509 that will contain the magic number.

It is apparent from the foregoing detailed examination of the statements at 709 that data def 407 in data format description 401 contains all of the information necessary to automatically generate the statements at 709. It is also apparent that the information which the statements 709 write to elem0 contains everything needed to automatically make magic number element 509 in the XML representation of the data contained in the AU object.

The remaining groups of statements work generally as described with regard to group 709. In each case, a decode method for the field's data type reads the data type; any necessary constraints are checked, and the element and its label are written to elem0. The group of statements at 719, which makes the XML element corresponding to information field 319 is somewhat more involved. If there is an information field, it will be located between header 305 and the beginning of audio data field 321. tmp01 contains the beginning of the audio data from field 309; that value minus the header size, or 24 bytes, gives the length of information field 319. The information field, if any, is read as just described, and added to elem0. Data format definition 401 specifies at 441 that audio data field 321 is not to be included in the XML object, and so there is no code in the decode procedure for reading that field. When all of the fields have been read, elem0 is added to docinstance (721) and docinstance's exportToXML method makes the contents of docinstance into an XML object (723). As already noted, XML object 501 contains a number of elements at 507 that are not obtained from Au data format 301. The exportToXML method obtains the information needed for those elements from the Auformat object, which in turn obtains them from DFD registry 221. FIG. 16 shows the implementation of encode method 613 produced by data format handler generator 205. It is in general similar to decode method 611 in its structure, except that it is reading from XML object 501 and writing to AU data format object 301. It begins by creating a variable docinstance to store the data from XML object 501 while it is being encoded. Then it creates elem0 as a new instance of a data element that will hold an element from XML object 501 while it is being encoded. The name of the instance is set to "AuFormat", which relates it to <AuFormat> </AuFormat> element 505 of XML object 501. The rest of the code for encoder 613 fetches each of the elements of XML object 501 which contains a value that is contained in AU data format object 301.

The code indicated at 1603 is exemplary. It gets the "magic number" for Au data format field 307 from <magicNumber> </magicNumber> element 509. A temporary variable tmp00 is set using the getDataComponentInt method of elem0. This method reads an integer value from the < ! [CDATA [ . . . ] ] > element contained in the magicNumber element. The integer value is of course the magic number. The value of tmp00 is then tested to make sure that it is in fact the magic number; if it is not, an exception is thrown; if it is, the method of filter for encoding integers outputs the encoded integer to field 307 of object 301.

Figure 17:
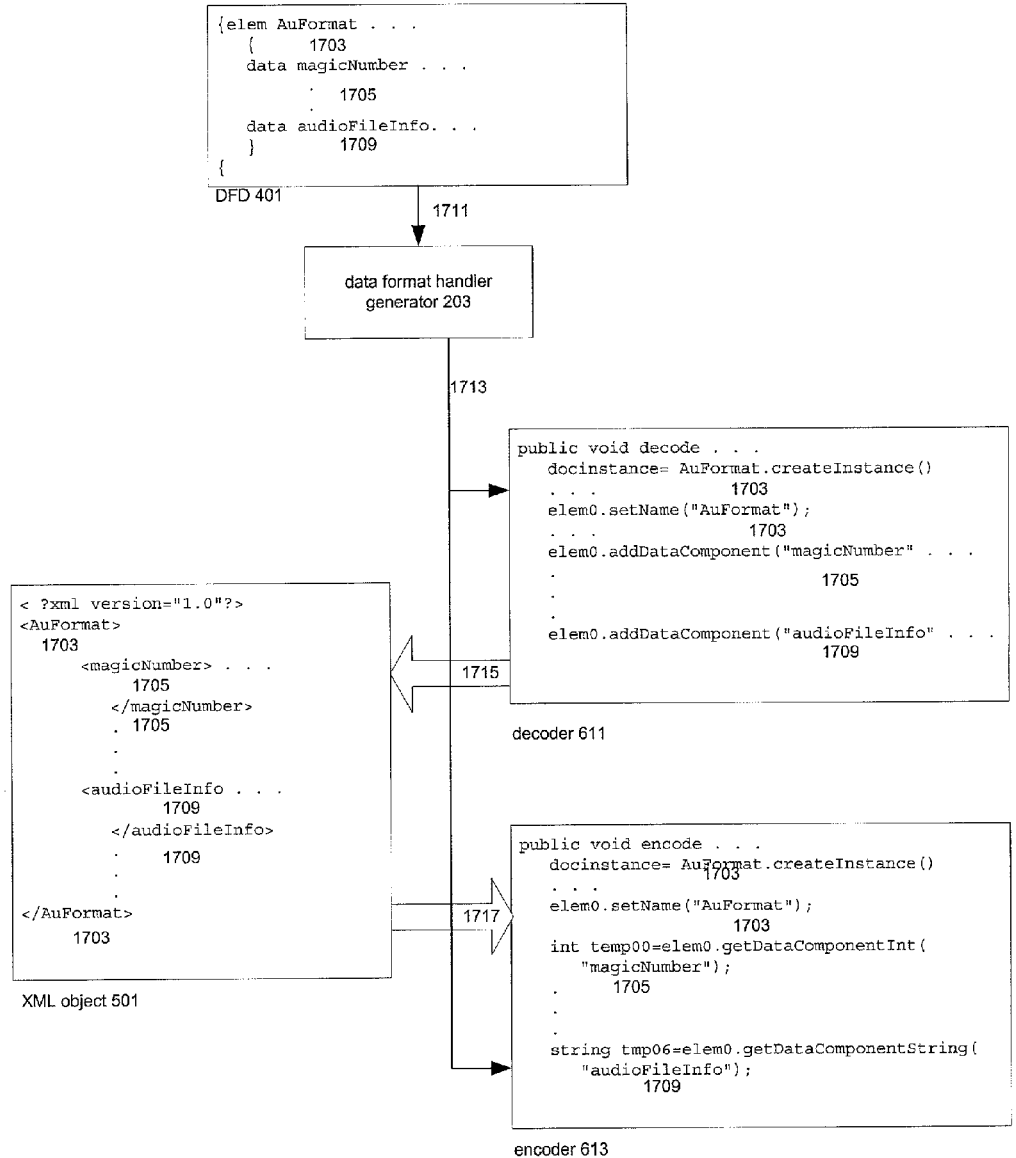
FIG. 17 shows the relationship between tags in a DFD, identifiers and character string constants used in the Java code for the encoder and decoder, and the names of elements in the XML document written by the decoder and read by the encoder.

Tags, XML Element Names, and Names and Constants in Encoders and Decoders: FIG. 17

As is apparent from the foregoing discussions of data format descriptor 401, XML object 501, decoder 611, and encoder 613, the tags employed in DFD 401 appear as identifiers and string constants in decoder 611 and encoder 613 and as XML element names in XML object 501. It is these tags which relate an element of an Au object 301 which is being decoded by decoder 611 to the element of XML object 501 that will contain the decoded data from the element of Au object 301 and which relate an element of XML object 501 to an element of Au object 301 which is being encoded by encoder 613.

FIG. 17 shows the relationships 1701 between tags in DFD 401, decoder 611, XML object 501, and encoder 613. Shown in DFD 401 are three tags:

AuFormat tag 1703 that identifies the DFD element from which data format handler generator 203 can generate encoders and decoders for objects having the Au format;

magicNumber tag 1705, which identifies the DFD data definition corresponding to the Au format's magic number field 307; and audioFileInfo tag 1709, which identifies the DFD data definition corresponding to the Au format's information field 319.

These reference numbers are used to identify identifiers, string constants, and XML element names derived from the tags. An identifier derived from AuFormat tag 1703 is used in decoder 611 and encoder 613 as an identifier to specify a class of DfmData element. A string constant derived from AuFormat 1703 is further used as a constant to label the storage indicated by the variable elem0, and thereby to indicate that the outermost element of XML object 501 is to have the name AuFormat. With magicnumber 1705 and audioFileInfo 1709, string constants derived from the labels are used in decoder 611 to label data that will be placed in contained elements of XML object 501, and these string constants appear as the names of these contained elements in XML object 501. In encoder 613, magicNumber 1705 and audioFileInfo 1709 appear as string constants in statements that fetch the contents of elements of XML object 501, and the string constants identify which elements the contents will be fetched from.

While the technique just described of relating portions of encoder and decoder code to an XML object's elements by means of the DFD's tags is particularly useful with XML objects, the technique can be used with any representation of an object that has the following properties:

- parts of the representation are associated with unique names; and
- parts that are associated with unique names may store one or more varying-length data fields.

For example, the names of the elements of any legal XML representation make up a hierarchy in which each element name is unique within the hierarchy. Thus, in XML object 501, the root of the hierarchy is the AuFormat element; the next level of nodes in the hierarchy is made up of the elements magicNumber through mimeType; and each node has a unique name. Thus, the qualified name of the node corresponding to the element magicNumber is AuFormat.magicnumber.

Figure 9:
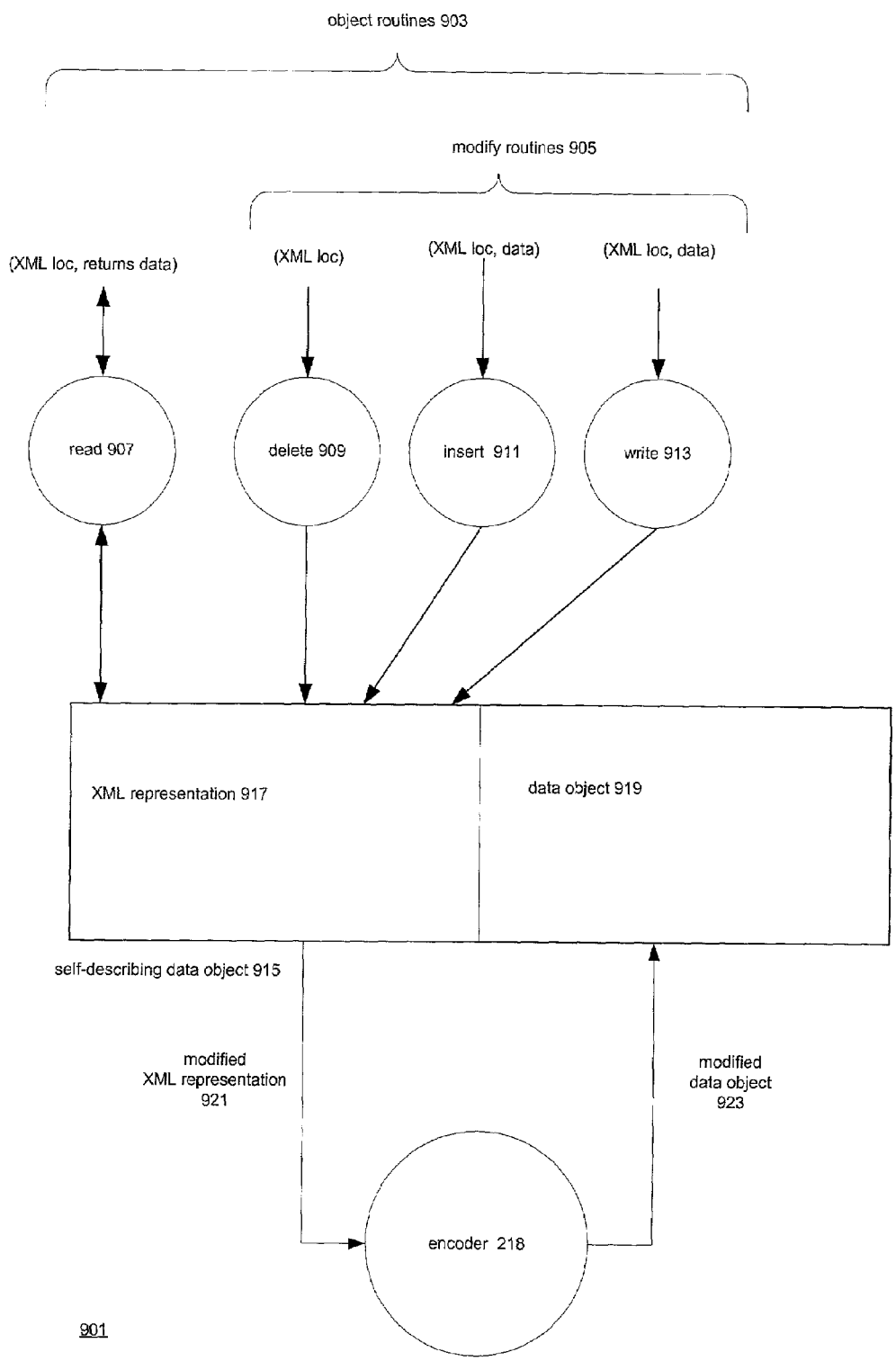
FIG. 9 shows how the data format handler can be used in a system where changes in the XML representation of the data object are reflected in the data object.

Using the XML Object to Access the Data Object: FIG. 9

All of the data format handlers 213 generated by handler generator 205 in a preferred embodiment translate between a data object having a particular format and a representation of the data object in the XML format. If the system in which the data object is being used always associates the data object with its representation in the XML format, then the data object becomes a self-describing data object and operations on the data object may be replaced by operations on the XML representation. The advantage of operating on the XML representation instead of on the data object is that the routines that perform the operations need only be able to deal with XML representations, not with the formats of all of the data objects.

FIG. 9 shows an arrangement 901 for performing operations on a self-describing data object 915. The self-describing data object has two associated parts: the data object itself at 919 and the XML representation 917 of the data object produced by a decoder such as decoder 216. The parts can be associated in many ways; for example, both might be components of an object for which a decoder 216 and an encoder 218 are methods. Both might also be fields of a given record in a database table.

Object 915 is accessed by means of object routines 903. These routines specify locations in XML representation 917, but when a routine performs an operation that modifies XML representation 917, the modified XML representation 921 is immediately encoded by encoder 218 to produce a modified data object 923 that replaces data object 919 entirely or in part. The latter is the case when XML representation 917 does not include one or more fields of data object 919.

Object routines 903 thus fall into two classes: those shown at 905 that modify data object 915 and those that do not. Here, there is one example of the latter: read routine 907, which takes a location in the XML (specified by an XML element name), reads the data at that location, and returns it. Since nothing changes in XML representation 917, nothing need change in data object 919. There are three examples of modify routines: a delete routine 909, which takes an element name as an argument and deletes the element having the name from XML representation 917, an insert routine 911 which takes an element name and data an arguments and inserts the data as a new element into the specified element, and a write routine 913, which takes an element name and data as arguments and replaces the data in the element name with the argument data. With each of modify routines 905, when the routine is finished modifying XML representation 917, it invokes encoder 218 for the format of data object 919 to encode the modified XML representation 921 and replace data object 919 with the modified data object 923. A modify routine 905 can locate encoder 218 for the format of data object 919 because the root element name in the XML representation appears in the name of the format handler object for the data object. Thus, if data object 919 has the AU Format, a modify routine can invoke the encoder as AuFormatHandler.encode.

The technique just set forth for modifying a data object by modifying its XML representation completely rewrites the data object whenever the XML representation is modified. An optimization which makes this unnecessary is to include information about the locations of fields of the data object relative to the beginning of the data object in the XML representation. With fixed-length fields, the location by itself may be sufficient; with variable-length fields, the length of the field may be included. In the latter case, the field may be rewritten if its new length is less than or equal to its old length; if its length is longer than its old length, the entire data object must be rewritten as defined above.

Figure 8:
FIG. 8 is Java code showing the standardized interfaces for the automatically-produced data format handler.

Standard Interfaces for Generator 205 and Decoder 611: FIG. 8

An advantage of the encoders and decoders generated by data format handler generator 205 is that they all have the same interface. Any encoder or decoder generated by data format handler generator 205 may be called using this interface, and thus any of these encoders or decoders may call any other of these encoders or decoders, as well as any other encoders or decoders that obey the interface.

The relevant interfaces, written in Java code, are shown at 801 in FIG. 8. Interfaces 802 are for methods for the class CodecGenerator, whose objects are data format handler generators 205. The interface at 803 is for a constructor for an object of class CodecGenerator; the interface at 805 is for the parser and compiler portions of data format handler generator 205. generateCodecContext 805 takes as its input a data format description 203 and returns CodecContext, which is format handler context 217 for generated data format handler 213. In a preferred embodiment, the context includes the tree of names for the data format description 203 from which the encoder and decoder are generated. The interfaces at 807 and 809 are for code generator 211; Interface 807 is the interface for the part of code generator 211 that generates decoder 216; Interface 809 is the interface for the part of code generator 211 that generates encoder 218; both take the CodecContext generated by interface 805 as an argument.

The preferred embodiment's standard interface for a decoder object is shown at 811. There are two methods: setPreference 813, which sets preferences in the decoder, and decode, which is the method that actually does the decoding. Preferences are used to set optional features of the decoder's output. For example, whether to include the address of the field in the data object that corresponds to a given XML element in the XML element, as described above, is determined by setting preferences. The interface for decode is shown at 815; the method takes an argument 817 that specifies the source of the data being decoded, an argument 819 that specifies an input redirection callback that may be executed after a field of the data being decoded has been decoded; as will be described in detail later, an attribute in data format description 203 may specify whether the callback specified for the decoder is to be executed for a data field specified in the data def. Encoders have output redirection callbacks instead of input redirection callbacks. The next argument, 821, specifies a callback that will be executed when an error occurs during decoding of a data field specified in a data def; again, whether the callback will be executed is determined by an attribute in data format description 203. The last argument, 823, finally, specifies the destination of the decoded data. The interface for an encoder is the same as that for the decoder, except that the first argument specifies an XML document as the data source, the last argument a location to which a representation of the data object may be written, and the callback argument an output_redirection callback instead of an input_redirection callback.

There is one set of callbacks defined for each DFD; attributes on the dataDefs determine whether the relevant callback is turned on for that dataDef. Like encoders and decoders, callbacks have standard interfaces. The interface for an input redirection callback is shown at 827. The arguments are indicated at 829. They include the qualified tag 831 for the data def from which the callback is being called, the element name 833 for the XML element from which the field of the data item being encoded will be made, the name 835 for the XML element that is the root of the XML document, a callback hint 837 which is information specified in an attribute associated with the data def representing the field being encoded, and a status indicator 838 that indicates the result of the operation performed by the callback. The interface shown at 839 for error callbacks is substantially the same as that for the decoder callbacks.

Figure 10:
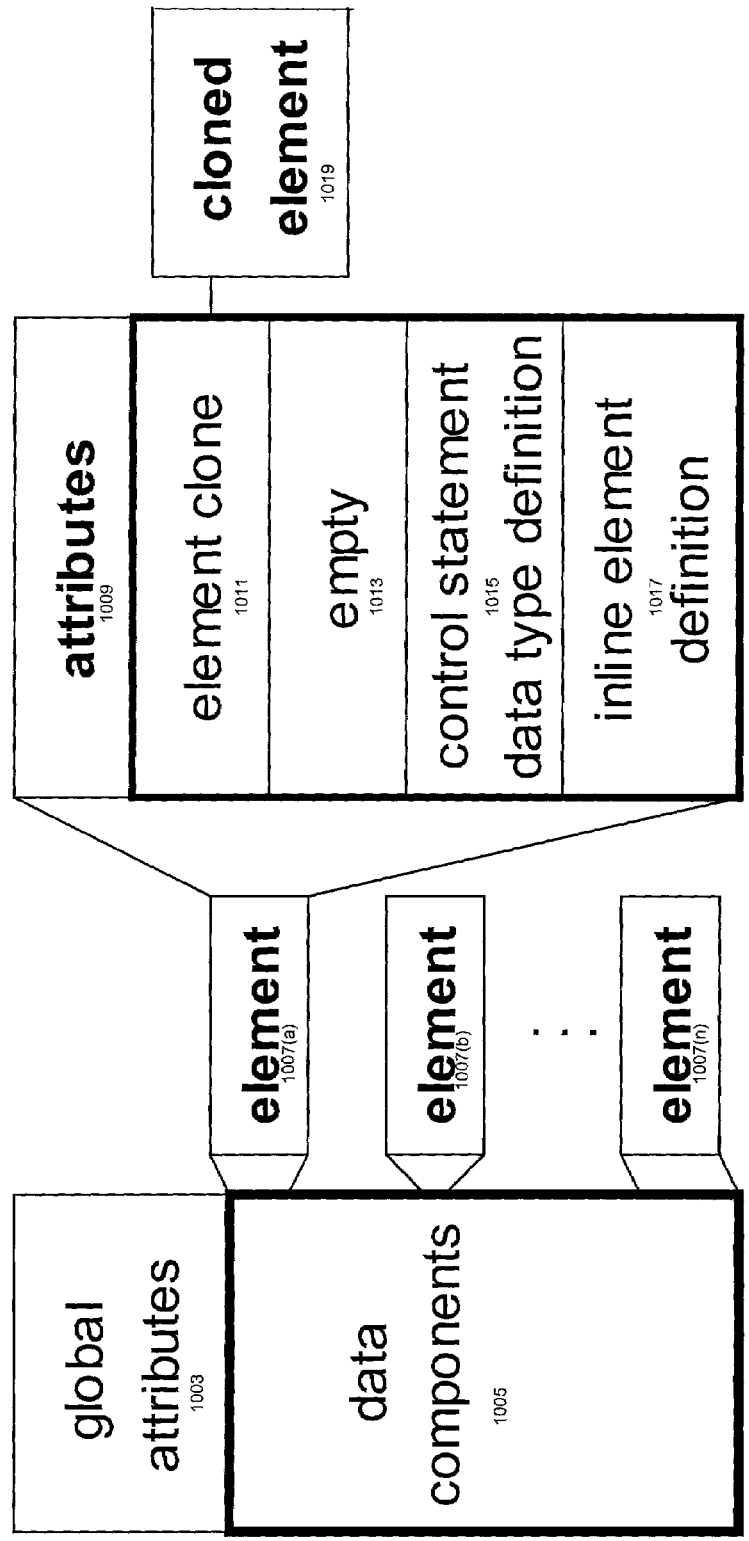
FIG. 10 is a diagram of the structure of the DFD.

Overview of the DFD Language: FIG. 10

The following will first present a high-level over view of the BNF syntax of the data format description (DFD) language of the preferred embodiment. A complete BNF 1101 for the language is included in FIGS. 11 through 13. The DFD language is made up of data items. A data item may be a data element or a data component. The top-level BNF syntax for a data format description (DFD) 203 written in the DFD language used in a preferred embodiment is this:

DFD := {(elementDef)+} that is, it consists of a list of one or more elementDefs (indicated by ( . . . )+), with the list being enclosed in braces { . . . }. An elementDef is defined like this:

elementDef:=elem[stringExpr] {[attr attributeList;]dataStatement}

Each element begins with the keyword elem and may include an optional tag (that the tag is optional is indicated by the square brackets [ . . . ]). The body of the element is contained within a pair of braces and includes an optional attr keyword followed by a list of attributes and a data statement. The attributes apply to the data statement unless overridden by other attributes within the data statement. A dataStatement is defined as follows:

dataStatement:=(comment | declare | assign | control | dataDef | elementDef)+

A dataStatement is thus a list of one or more elements, where an element may specify a comment, a declare operation, an assignment operation, a control operation, a dataDef, or a nested elementDef.

A dataDef finally, specifies data that will be converted between the data object and the XML object. A dataDef is defined as follows:

dataDef := data [stringExpr] {[attr attributeList;]
  like stringExpr |
  is stringExpr | elementDef}

The dataDef begins with the keyword data and an optional tag. The body of the dataDef may include an attribute list; if the body has the like keyword, it indicates that the dataDef is defined by the dataDef associated with the tag following like. If the body has the is keyword, it indicates that the dataDef is defined here. What follows the is keyword may be either a keyword describing a primitive data type or an elementDef. In the following, a component of a data format description that is defined by a dataDef will often be termed a data component.

As may be seen by the above top-level overview of the BNF, each data element is a container and forms a unit of structure reference and a scope of data encoding behavior specification. It may contain child data components that can be a primitive data type, an empty type or an element type. For an element type, its definition could either be stored inline or referenced from somewhere else. The element data component type may then recursively contain more data component definitions, thus allowing complex data structure definition. By default, each data element or data component has a set of attributes that covers all aspects of binary data representation such as bit arrangement, endianness, data packing, default format and encoding standard. Each attribute has default values that can be overwritten by an element or a data component with new attribute definition. Each child data component inherits the attributes definitions of its parent element, but it may overwrite part or all of them.

An important aspect of DFDI is the use of expressions in attribute and data definition statements. Four types of expressions are defined in DFDI: bit, integer, string and Boolean expressions. They are allowed both in assignment statements and in data definition statements, and they significantly improve the flexibility and expressiveness of DFDI. The use of run-time values in the expressions allows dynamic behaviors such as defining elements and data components at runtime. It also allows a data format provider to introduce derived data into XML representation. Two particularly interesting expressions are @ {stringExpr} and $ {stringExpr}

In both cases, stringExpr must evaluate to a tag. @{stringExpr} has as its result a 64-bit integer which is the bit address in the data object of the field specified by the data Def to which the tag belongs. $ {stringExpr} has already been illustrated; its result is the value of the field specified by the data Def to which the tag belongs.

FIG. 10 illustrates data definition in the DFD language. A data format description 203 contains one root element 1005, which itself contains some global attribute definitions 1003 and several subelements 1007(A . . . N). A subelement, as illustrated for element 1007(*a*), may have its own attributes 1009. Where present, these attributes overwrite any relevant global attributes. Element 1007(*a*)'s data components 1011–1013 include several different kinds of statements. Statement 1011 refers to an existing element 1019 of which it is a clone. Statement 1013 is an empty element; statement

1015 has several control statements and some inline data type definitions. The last element, 1017, is an inline element definition, which defines a new sub element within the current element.

Each element or data component may optionally include a tag following the keyword for the element. Tags have two purposes. In the DFD, they are identifiers for fields in the data object; in the XML representation of the data object, they are element names in the XML representation of the data object. There is a deterministic mapping based on the tags between a DFD and the XML representation. The mapping is described in detail following the detailed description of the DFD language. A tag uniquely identifies a data item within its parent data element. A data item can also be uniquely identified systemwide by concatenating tags hierarchically. Since a root element has system wide unique tags, its tagged child elements can all be uniquely identified by prefixing their tags with the root element's tag, separated by the tag concatenate operator ".", and so forth. Only when a data item and all of its ancestors are prefixed by tags, can the data item be mapped into an XML representation. In a preferred embodiment, a tag is defined only if it is a valid tag name; it is externally available only if it is registered with a data format registry 221. As already pointed out, some expressions include tag values. In the system in which the generated format handlers of the preferred embodiment are employed, native functions are provided to check whether a tag is defined or its associated data item is present in binary or XML representation.

Details of the DFD Language of the Preferred Embodiment: FIGS. 11–15

Lexical Components

This section lists all lexical elements of DFDI. Their meanings are described in detail in the following section. The DFD language is built on top of the ASCII (U.S. version of ISO 646) character set.

Keywords elem, data, attr, int, if, else, while, switch, case, string, bit, bool, is, like, break Identifiers Identifiers can be classified into three categories. The first category is natively defined and reserved identifiers including attribute names and natively supported functions. The second category is data element and data component tags. The third category is user-defined variables. Tags and variables start with a letter and followed by zero or more digits or letters.

Operators

Integer arithmetic operators: + plus, − minus, * times, / divide, - unary negation, % mod.

Bit operators: <<shift left, >> shift right, & AND, | OR, ^ XOR, ~ complement.

Logical operators: && AND, | OR, ! NOT.

Conditional operators: > greater than, >= greater than or equal to, < less than, <= less than or equal to, == equal to, ! = not equal to.

Assignment operator: = assignment.

Concatenate operator: + concatenate (for string and bit type).

Address operator: @address of (followed by a tag enclosed by braces).

Value of operator: $ value of (followed by a data component tag enclosed by braces).

Constants, Comment and Separators

Comment, any string following the "#" sign to the end of the line.

Integer constants: 0, −1, 100.

String constants: "little", "a".

Expression parentheses: ( )

Sentence parentheses: { }

Sentence separators: ; semicolon.

Word separators: whitespace, tab, newline.

Tag concatenate operators: . dot.

Major Components of the Grammar

Data Format Description (DFD)

A data format descriptor must conform to the DFDI grammar for it to be compiled and automatically transformed into a format handler. The syntax of a data format description is:

$$DFD := \{(elementDef)+\} \quad (1)$$

which means that the description may contain one or more element definitions enclosed by braces. Each element definition elementDef (definition 2 below) defines a root level element for the format descriptor, which may recursively contain more elements.

Element Definition

An element is a container type for data structure definition. The syntax for an element definition is:

$$elementDef := elem\ [stringExpr]\ \{[attr\ attributeList;\\ ]\ dataStatement\} \quad (2)$$

It starts with the keyword "elem", followed by an optional string expression to specify the element tag, and body of element definition enclosed by a pair of braces. Inside of its body are an optional attribute definition and a mandatory data definition. For any root element, the element tag is mandatory and will be uniquely registered with the data format registry. An element defines a scope for attribute definitions. All data components contained inside share the same attributes. A child data component may however overwrite part or all of its parent's attribute definition with its own. An element forms an atomic unit for reusable structure definition. It can be uniquely identified within its parent element by its tag, which serves as a handle for both data access and definition reference.

Attributes

Attributes define many aspects of the encoding, arrangement, and processing of a data item. The syntax for an attribute list is:

$$attributeList := attributeName=\{attribute\ Value\}\ [,attributeList] \quad (3)$$

As shown in definition 2, an attribute definition is the first part of an element definition. The attribute definition starts with the keyword "attr" and following by a list of attributes definitions. The list is comma separated, each starts with an attribute name, followed by an equal sign, then the actual attribute value enclosed by curly braces. An attribute value can be either a constant or an expression. Attribute definitions may also appear in primitive data component definitions. Many attributes require the specification of the bit length. The format for a bit length specifier is "byte.bit", where the ".bit" portion is optional. For example, "30" means a length of 30 bytes, "0. 6" means a length of 6 bits and "30. 6" means a length of 246 bits. In the following, bitLenExpr specifies the bit length.

$$bitLenExpr := intExpr\ [.\ intExpr\ ] \quad (4)$$

Each attribute has a default value that corresponds to the most common case of the attribute. The natively defined attribute names are classified into four groups: presence, binary layout, presentation, and data processing. A detailed semantic and syntactic description of these groups and the attributes that belong to them follows.

Presence Attributes

Figure 12:
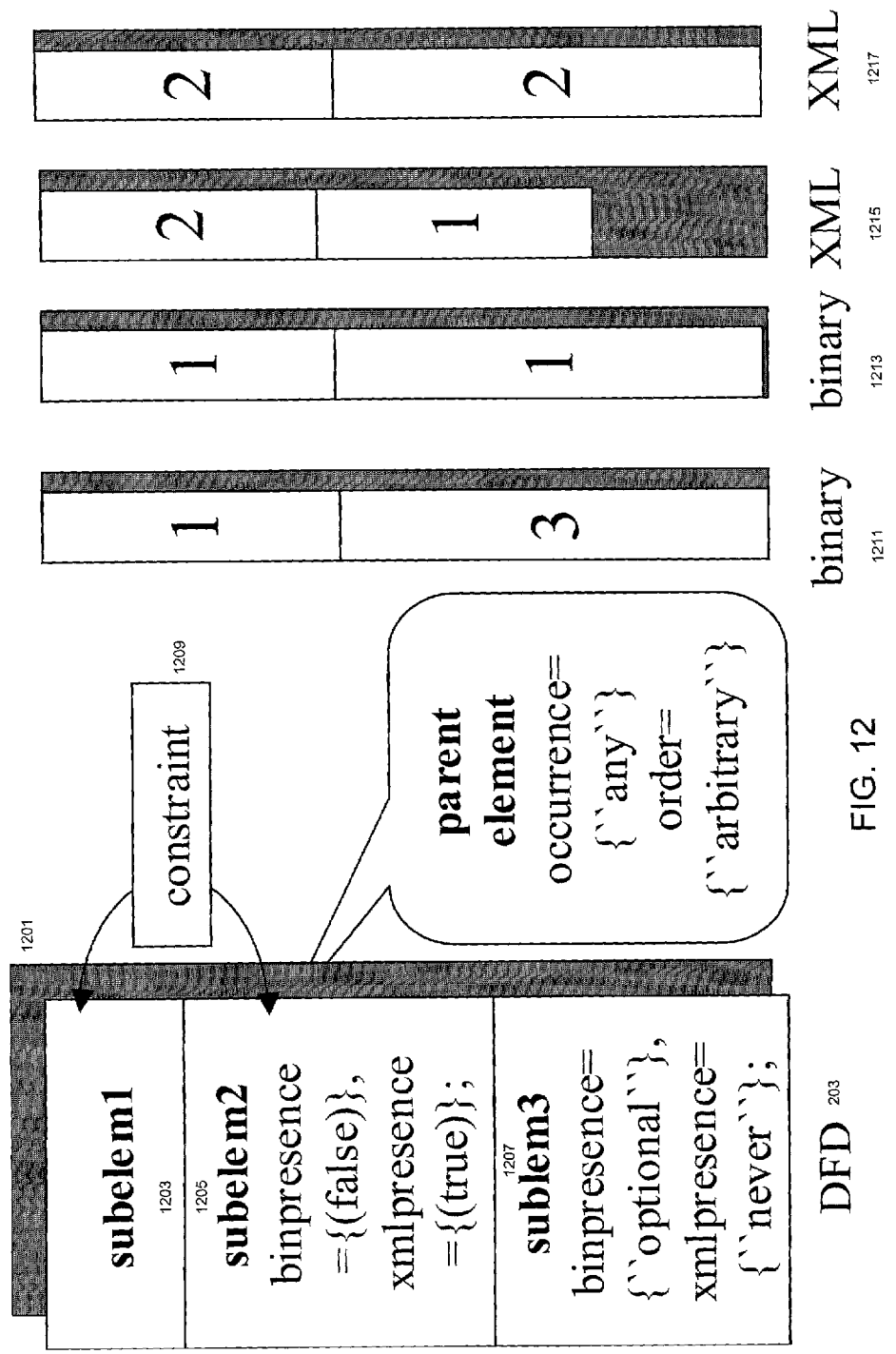
FIG. 12 illustrates presence attributes.

FIG. 12 shows a DFD 203 with presence attributes and the effect on the data object to which DFD 203 is applied and the XML object to which the data object is converted. FIG. 12 shows a data item 1201 in the DFD 203 which includes three other data items 1203–1207. The including data item is termed the parent data item and the included data items are termed child data items. There are two presence attributes in parent data item 1201: an occurrence attribute and an order attribute. Of the child data items, child 1205 and 1207 both have a binpresence attribute and an xmlpresence attribute. The binary and XML representations 1211–1217 show the effects of the values to which the latter elements are set.

$$\text{occurrence} = \{\text{stringExpr}\} \quad (5)$$

The occurrence attribute specifies how an element's child data components appear in binary or XML representation. Valid values are "once" (the default), "all", "any" and "oneof". The value "once" means each data component appears exactly once. The value "all" means each data component appears at least once. The value "any" means each data component appears zero or more times. The value "oneof" means only one of the child components may appear. In FIG. 12, parent attribute 1201 has occurrence attribute value of "any", which means its child items may or may not appear in either representation.

$$\text{order} = \{\text{stringExpr}\} \quad (6)$$

The order attribute specifies in what order a data item's child data items may appear. Valid values are "sequence" (the default) or "arbitrary". The value "sequence" means that if the data components appear in either XML or binary representation, they must follow the order specified by the data format descriptor. The value "arbitrary" means child data components may appear in any order. In FIG. 12, parent attribute 1201 has order attribute value of "arbitrary", which means its child items may appear in any order, and does not have to agree with the order they appeared in the DFD.

Presence Attributes

There are two presence attributes. One, binpresence, indicates whether the data item to which it belongs is present in the data object. The syntax for binpresence is this:

$$\text{binpresence} = \{\text{stringExpr}|\text{conditionExpr}\} \quad (7a)$$

The other, xmlpresence, indicates whether the data item to which it belongs is present in the XML representation. Its syntax is this:

$$\text{xmlpresence} = \{\text{stringExpr}|\text{conditionExpr}\} \quad (7b)$$

A data item in a DFD defines a deterministic mapping between a binary representation of a data item and its XML representation. By default, if a data item and all of its ancestors are tagged, it will be mapped into XML representation. However, a particular conversion may not require that all fields in the data object represented by tagged items in the DFD need to be mapped from the data object into XML elements, and vice versa. This leads to data that is present in one representation but not in the other, and the presence attribute captures such behaviors. An example of the use of the xmlpresence attribute may be found at 441 in FIG. 4, where the attribute indicates that the actual audio data from an object with the Au format will never be included in the XML representation.

Both attributes may take two types of input values. The first type is a string expression for data presence, which must evaluate to "mandatory", "optional" or "never". If the string expression evaluates to "mandatory", the data must be present in the data object or the XML representation, as indicated by the kind of presence specified. "mandatory" is the default for these attributes. If the string expression evaluates to "optional", the data will be present in the XML representation if it is present in the data object and vice-versa. "optional" is used to deal with data that is optional in either the data object or the XML representation. The "never" value is useful to define derived data items or items for version compatible reasons.

If the presence attribute is specified with a conditional expression, the item then has "conditional" presence. It is present in a binary or an XML representation only if the conditional expression evaluates to true. In FIG. 12, child item 1205 has the binpresence attribute with the constant conditional expression "false", which means that the field corresponding to the child item it will never appear in a binary representation. Child item 1205's xmlpresence attribute has a value of "true", which means that an XML item corresponding to the child item will always appear in the XML representation. The effects of the presence attributes in parent data element 1201 and subelements 1205 and 1207 are shown in the objects at 1211–1217. The presence attributes in parent element 1201 specify that each of the child elements may occur zero or more times in the binary objects and XML representations made using DFD 203 and that the child elements may occur in any order. Thus, subelement 1 1203 appears once in data object 1211, twice in data object 1213, once in XML representation 1215, and not at all in XML representation 1217, and it appears as either the first or the second element. Subelement 2 1205's binpresence attribute is set to "false" and its xmlpresence attribute is set to "true", and consequently, the subelement appears in neither data object 1211 nor data object 1213, but appears once in XML representation 1215 and twice in XML representation 1217. Subelement 3 1207 has an xmlpresence attribute of "never" and a binpresence attribute of "optional", so it does not appear at all in XML representations 1215 and 1217 and appears in data object 1211, but not in data object 1213.

The Constraint Attribute $$\text{constraint} = \{\text{conditionExpr}\} \quad (8)$$

The constraint attribute enables consistency checking for a data item. Its value is a valid DFDI conditional expression. When an automatically generated data format handler processes a data item with a constraint, after the decoding or before the encoding of the item, it checks the validity of the constraint. If the constraint condition evaluates to false, a constraint violation exception will be thrown. FIG. 12 shows a constraint 1209 between subelements 1203 and 1205.

Binary Layout Attribute Group

Figure 13:
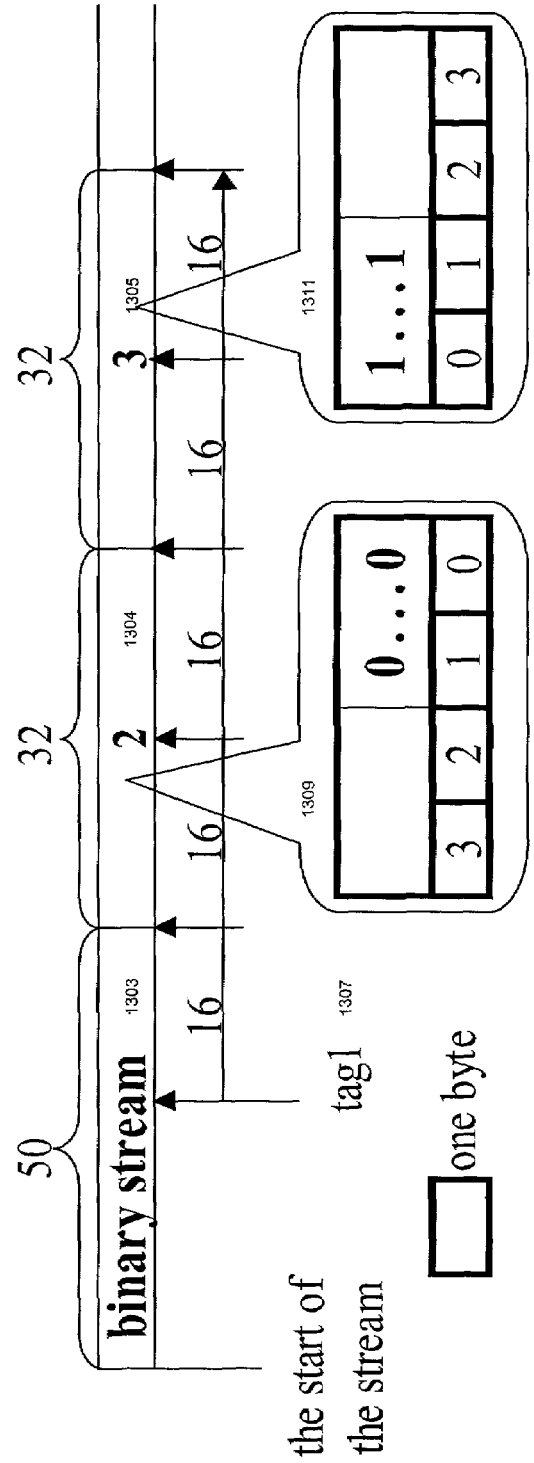
FIG. 13 illustrates binary layout attributes.

FIG. 13 illustrates the binary layout attribute group. This group of attributes determine how bit, byte and empty gap is arranged within a binary data stream and how to determine the start and the end of a data item. Positions of the data stream are specified in numbers of bits from a known point. FIG. 13 shows the binary layout attributes in the DFD for two data elements, element 2 1301 and element 3 1302. The fields of data stream 1303 corresponding to the DFD data elements are shown at 1304 and 1305, and details of the bit layout of field 1304 and 1305 at 1309 and 1311 respectively.

$$\text{address} = \{\text{bitLenExpr} [; \text{bitLenExpr}] \} \quad (9)$$

An address attribute specifies the starting and the ending address of the current data item, measured from the beginning of the field corresponding to the first root element of the parent DFD. By default, the document's structure is specified in sequence. The default value of the starting address is therefore the address of the bit immediately after the last bit of the previous data item. The default value of the ending address is then that of the last bit of the current data item. One may specify the starting address alone or both the starting and the ending address, separated by a semicolon. If the ending address is explicitly specified, it means the data item has a fixed length. If an item repeats, the length specified is the overall length, including all instances of the item plus the terminating element if there is any.

If the starting address has a value of "−1", it indicates that the current data item does not have a concrete binding to an address of a document. It could be a declaration intended to be referenced somewhere else in a DFD. Such a data item does not have a mapping to either an XML representation or a data object. The ending address, if specified for this case, is then simply the overall length occupied by the current data item. In FIG. 13, element 2 1304 has an address specification of "6. 2", meaning that it starts 50 bits from the starting position in stream 1303. One important expression for specifying the address is the addressof operator, described in more detail later on.

$$\text{alignment} = \{\text{bitLenExpr}[; \text{stringExpr}]\} \quad (10)$$

The alignment attribute defines the positioning of the first bit of a data item, or the positioning of the first bit of every occurrence of a data item if it repeats. The optional string expression evaluates to a tag name that defines a starting position. If omitted, the default starting position is then the first bit of the current data item. The bit length expression defines an alignment length, denoted by number of bits n. For each occurrence of a data item, the number of bits c between its leftmost bit and the starting position is counted. The alignment attribute requires that the leftmost bit be shifted to its right if necessary, so that c is a multiple of n. By default, the alignment number is 0. 1 (1 bit), which means no alignment is necessary, so that a data component may be stored across byte boundaries. In FIG. 13, both element 2 1304 and element 3 1305 are described in their corresponding DFD elements 1301 and 1302 with an alignment attribute that has an alignment value of 2 (16 bits), measured in both cases from the location indicated by the DFD element identified by tag1 1307. The possible legitimate starting positions for element 2 and element 3 are at the points in the bit stream marked by the vertical arrows.

$$\text{packing} = \{\text{stringExpr}\} \quad (11)$$

The packing attribute defines the placement of bits within a data item. A data item may have a size that is smaller than the space provided for it. This may be a result of alignment or length attribute definition. For example, 12-bit depth image is very common for medical images. Such data could either be stored tightly packed so that two numbers occupy three consecutive bytes or be stored loosely so that each number occupies two bytes. The former case is termed "tight" packing and is the default. For the latter case, the unoccupied bits may be left as they are or be filled with zeros or ones, either from the left or from the right. This leads to seven possible values for packing: "tight" (the default), "left", "right", "leftZeroPad", "rightZeroPad", "leftOnePad", "rightOnePad". In FIG. 13, element 2's DFD 1301 specifies a packing value of "rightZeropad", so the rightmost two bytes of element 2 1304 are packed with "0" bits, as shown at 1309. Element 3's DFD 1302 specifies the packing value "leftOnePad", so the leftmost two bytes are packed with "1" bits, as shown at 1311.

$$\text{endian} = \{\text{stringExpr}\} \quad (12)$$

The endian attribute defines the endianness of multi-byte data for the current data item. The string expression must evaluate to either "big" (the default) or "little", which corresponds to big endian (most significant byte first) or little endian encoding respectively. In FIG. 13, element 2's DFD specifies "big" in its endian attribute; consequently, the bytes of element 2 1304 are ordered such that the most significant byte is encoded first, as shown at 1309, while element 3's DFD specifies "little" in its endian attribute and the bytes of element 3 1305 are ordered such that the least significant byte is encoded first, as shown at 1311.

$$\text{bitorder} = \{\text{stringExpr}\} \quad (13)$$

The bitorder attribute defines the order of the bits inside of a byte. Within a byte, bits may be encoded such that the most significant bit first, "big" (the default) or the least significant bit first, "small".

Presentation Attribute Group

Figure 14:
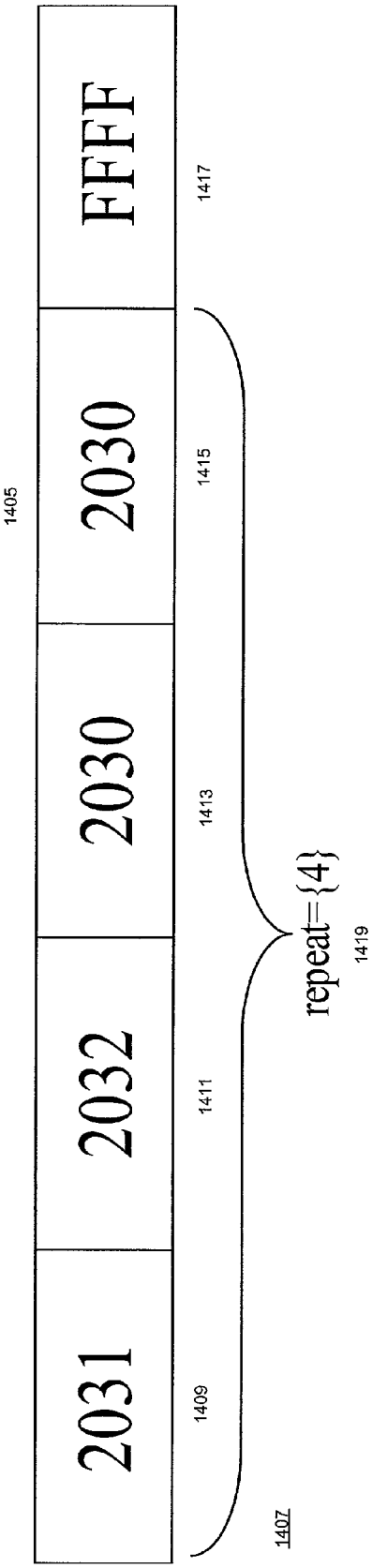
FIG. 14 illustrates presentation attributes.

FIG. 14 illustrates attributes belonging to the presentation attribute group. These attributes determine the content of a binary stream. They cover aspects such as data length, encoding method, repetition, default values and terminating symbols. In FIG. 14, a binary stream 1407 of 10 bytes is shown; the stream contains four integer values, each represented in 16 bits, and a 16-bit end of data tag. As shown at 1401, the four integers have the values 1,2,0,0, and the end of data tag has the value −1. In the bit stream, the integers are encoded as ASCII characters, with the ASCII code for the "blank" character in the first byte and the ASCII code for the numeral in the second byte. When these codes are expressed in hexadecimal notation, "1" in field 1409 becomes x2031, "2" in field 1411 becomes x2032, and "0" in fields 1413 and 1415 becomes x2030. The end of data tag is xFFFF, or all "1" bits. The formatting of fields 1409–1415 is described by the attributes in data Def 1405 for integerList and the formatting of field 1417 is described by the attributes in data def 1403 for endtag.

$$\text{endwith} = \{\text{stringExpr}\} \quad (14)$$

The endwith attribute defines the terminating data item of a variable length structure and should be used in conjunction with the repeat attribute. It takes a string expression as input, and has the default value of an empty string. Valid string expression values are "% EOD", "% ERR" or a tag name. The value "% EOD" stands for the end of data, which means a data item stops repeating if it reaches its ending address as defined by the address attribute. If the ending address is not provided, then a data item stops at end of a file (EOF) or end of stream (EOS) indicator. The value "% ERR" indicates that an item repeats until the input data is no longer compatible with its data definition. If the string expression evaluates to a tag name, then the data item ends with a terminating data item as identified by the tag. Under this circumstance, a decoder will check for the presence of the terminating element before repeating a data definition, and an encoder will append a terminating element after encoding an array of repeating data components, even if the length of array is zero. In FIG. 14, the endwith attribute of the data component 1405 integerList points to a data component 1403 endtag, which defines a two byte integer with a default value of −1.

$$\text{repeat} = \{\text{intExpr} [; \text{identifier}]\} \quad (15)$$

The repeat attribute specifies the expected length of a variable length data structure. The integer expression specifies the maximum number of times the defined data item may repeat in a binary or an XML data stream, and its default value is 1. If the integer expression evaluates to −1, it means the current data item repeats indefinitely, and the termination of the data depends on the endwith attribute and/or the presence attribute. The repeat attribute may also optionally introduce a local integer variable as identified by the identifier. The scope of the variable is from the beginning of the data item where it is defined to the end of the definition of that data item's parent data item. It is initialized to zero and evaluates to the number of times the complete data definition has repeated so far. The attribute repeat={4} in data Def 1405 specifies that the two-byte basic unit of integerList be repeated 4 times, as is shown at 1419. Note that the presence attribute has precedence over the endwith attribute, which itself has precedence over the repeat attribute. If the presence attribute is "mandatory", the repeat value must evaluate to a positive integer, otherwise a missing data exception will be thrown. If the presence attribute is "never", the repeat value will be ignored. If presence is conditional, the conditional expression will be evaluated before checking the terminating element and repeating a data definition. If the conditional expression evaluates to false, the data item stops repeating. The occurrence attribute in the presence attribute group differs from the repeat attribute in that the former controls the child data elements of the data item the occurrence attribute belongs to rather than the data item itself, while the repeat attribute is only meaningful for the data item in which it is defined.

$$\text{length} = \{\text{bitLenExpr}\} \tag{16}$$

The length attribute defines the number of bits the field represented by a data item actually occupies in the data object. By default, each primitive data type has a default encoding method, and a data element packs all the enclosed data items tightly. For the convenience of data input and output, some data formats encode a data type with more bits than necessary. For example, a Boolean type takes a single bit to store by default, but a data format may choose to use a byte to store each Boolean number. One may use the length attribute to overwrite this default to 8 bits. The placement of the actual data and the unused bits will be encoded according to the packing attribute. In FIG. 14, the length attribute of the data Def 1405 integerList has a value of 2, which means each integer in the list occupies two bytes, rather than the default length of 4 bytes per integer.

$$\text{value} = \{\text{expr}\} \tag{17}$$

The value attribute contains an expression that specifies a value for the current data item. In general, the data component that contains the value attribute is involved in both reading and writing a data item. For example, in a decoding operation, the data component describes how a field of the data object is read and how an element of the XML representation is written; in an encoding operation, the data component does the opposite. In reading, the value in {expr} specifies a value that must be contained in the field being read; if it is not there, an inconsistent value exception is thrown. An example of this usage is found at 412 in FIG. 4. In writing, the value in {expr} specifies a default value that is used where reading produced no value. For example, if a data component has either xmlpresence or binpresence attribute value of "never", and also has a value attribute, the value attribute simply causes the value of {expr} to be written in place of the value that would have been written absent the "never" presence attribute. Another example may be seen in FIG. 14. There, the data component "endtag" 1403 has a value attribute whose value is −1; "endtag" is then used in an endwith attribute at 1405, and the effect is that the value −1 specified in "endtag"'s value attribute is appended to the end of the integer list.

$$\text{format} = \{\text{stringExpr}\} \tag{18}$$

The format attribute specifies the encoding method used for the data type in the field of the data item object represented by the data item that contains the format attribute. Each primitive data type has a default encoding method. In addition, they can all be represented in using alternative encoding methods. For example, a float type may be encoded into binary according to the IEEE 754 standard (the default encoding method, represented with an empty string " "). It may also be encoded in decimals or in scientific notation. A format string may specify an ASCII character representation for a primitive data type such as an integer or a float. In FIG. 14, the integer data Def endtag has a value of "−1" and uses the default encoding method for integer data, which gives the field represented by the data Def the hexadecimal value "FFFF". The format attribute in the integerList data Def has the value "% d", which means that the integers are encoded as ASCII characters in the manner explained above. Note that the format attribute is meaningful only inside a primitive data Def. The particular way in which a format is specified in the format attribute is implementation-dependent. The examples given here use C style format specifications.

Data Processing Attribute Group

Figure 15:
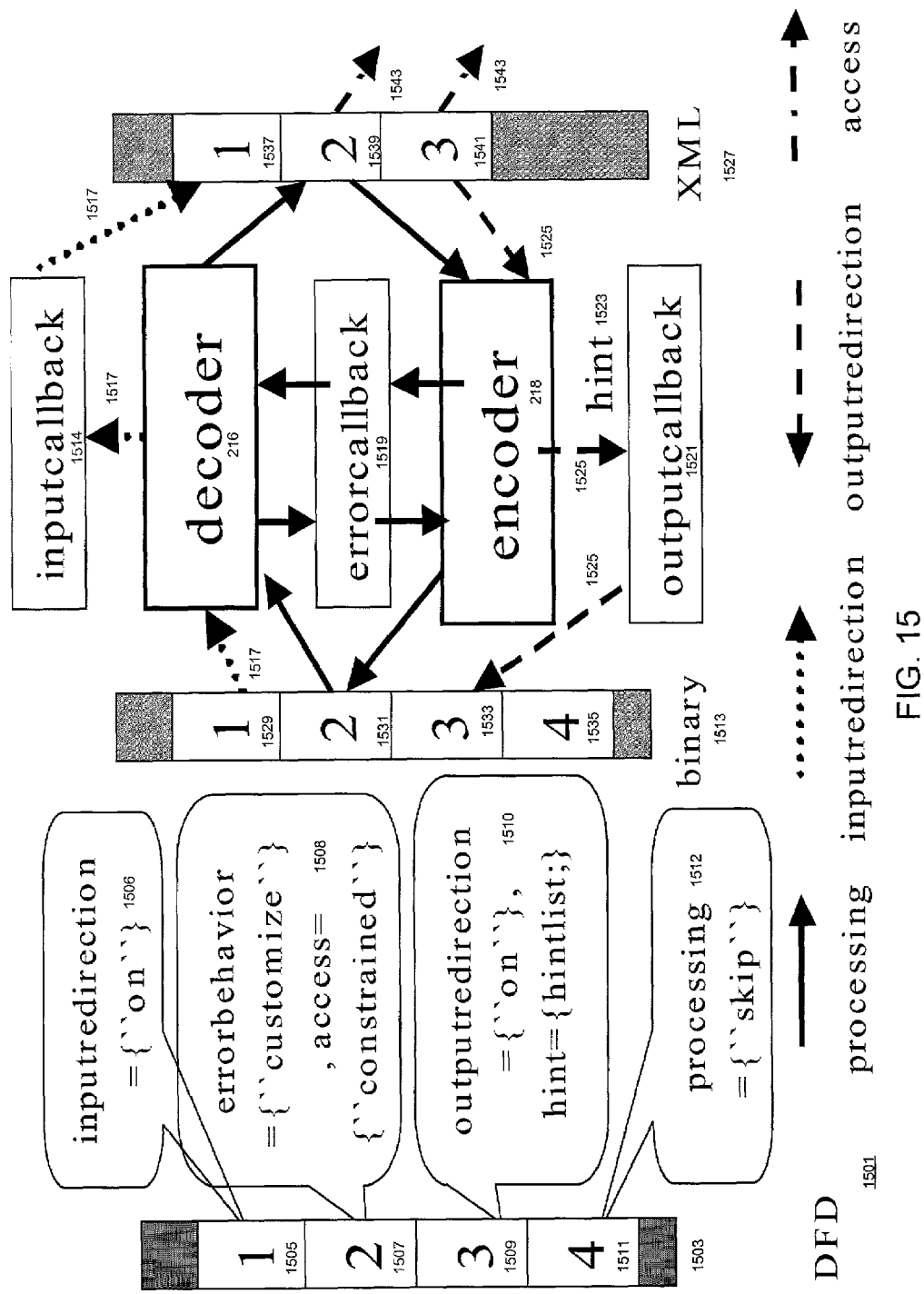
FIG. 15 illustrates data processing attributes.

FIG. 15 shows how attributes belonging to the data processing attribute group work. This group of attributes control the processing and updating of a data item by a data format handler. Shown at 1501 in FIG. 15 are four data elements 1505–1511 from a DFD 1503; the attributes of interest for each of the data elements appear in the balloon callouts 1506–1512. The four elements of the DFD 1503 correspond to four fields 1529–1535 of data object 1513; DFD 1503 maps three of these fields to elements 1537–1541 of XML representation 1527. The fourth field, field 1535, is not mapped. The processing required for the mapping specified in DFD 1503 is done by decoder 216 and encoder 218 generated from DFD 1503. In the course of the processing, the decoder and encoder employ three callback routines: input callback 1514, output callback 1521, and error callback 1519. Decoder 216 employs input callback 1514 to process input from field 1529 of data object 1513 and output the processed input to element 1537 of XML representation 1527; encoder 218 employs output callback 1521 to process input from element 1541 of XML representation 1527 and output the processed input to field 1533 of data object 1513; both the encoder and the decoder employ error callback 1519 to handle error conditions that arise in converting data object 1513 to XML representation 1527 and vice-versa.

$$\text{processing} = \{\text{stringExpr}\} \tag{19}$$

The processing attribute describes whether a data item should be encoded or decoded. Its value can be "skip", "encode", "decode" or "both" (the default). By using the processing attribute, one may skip a chunk of data that does not need to be processed or cannot be processed. Thus, data element 1511 of DFD 1503, which corresponds to field 1535 in binary 1513, has a processing attribute with the value "skip", and consequently, there is nothing in XML representation 1527 corresponding to field 1535. The default "both" value indicates that a data item will be decoded as well as encoded. One may use the string "encode" or "decode" to specify that the item should be only be encoded or decoded. Note that in general, the encoding and decoding of a data item is a reversible process: one may convert back and forth between a data object and the corresponding XML representation without loss of data. However, if one chooses not to encode or decode part of a data item, then the data conversion process becomes irreversible, and such is the case if the processing attribute is set to a value other than "both".

$$\text{access} = \{\ \text{stringExpr}\} \tag{20}$$

The access attribute provides access control information for the field of the data object and the element of the XML representation that correspond to the data item in the DFD that has the access attribute. The attribute's value may be "readwrite" (the default), "readonly" or "constrained". If the access attribute has the value "readwrite", both the field in the data object and the element in the XML representation corresponding to the DFD data element containing the access attribute may be modified; if the access attribute has the value "readonly", both the data object field and the XML element may be read but not written; if the access attribute has the value "constrained", as it does in data element 1507 of DFD 1503, there is a dependency between the value of the data object field and the corresponding XML element and the value of another data object field and corresponding XML element, and a change in the value of one of the fields and its corresponding XML element may require a change in the value of another field and its corresponding XML element. It is generally up to the client to ensure the integrity of such data access, since a data format handler may not able to check the validity of a constrained data item.

$$\text{hint} = \{(\text{identifier} = \text{stringExpr;})+\} \tag{21}$$

The hint attribute is used in a data element in DFD 1503 to pass parameters to callbacks used by a data format handler. Examples of hint are processing instructions, storage methods (inline or pointer), data statistics (range, maximum, minimum), data organization (for example, dimensions for a multidimensional array), data compression (compression algorithm and parameters) and data encryption. The hint parameter is passed to the callback function after the string expression containing the parameter is evaluated. The hint attribute shown at 1510 supplies a hint list 1523 to output call back 1521

Callback Attributes

One may optionally implement one or more callback functions and associate them with a data format handler 213 in the manner shown in FIG. 8. The callback functions include input redirection callbacks that are invoked by decoder 216 as part of decoding the data object, output redirection callbacks that are invoked by encoder 218 as part of encoding the data object, and error callbacks that are invoked by either encoder 218 or decoder 216 when an error occurs. There may be one of each of these callback functions associated with a given DFD. In a preferred embodiment, data components have callback attributes that turn a callback function associated with the DFD the data component belongs to on or off for the data component containing the attribute.

$$\text{inputredirection} = \{\ \text{stringExpr}\}$$

$$\text{outputredirection} = \{\ \text{stringExpr}\} \tag{22}$$

These callbacks turn input and output redirection callbacks on and off. An input redirection callback may read and modify a field of the data item, perform transformations on the field, or save its content to a file system. The value of an input redirection or output redirection attribute may be "off" (the default) or "on". When the portion of decoder 216 which corresponds to a data element in DFD 1503 which has an input redirection attribute whose value is "on" is executed, the decoder executes the input redirection callback after it decodes the field of the data object that corresponds to the data item whose input redirection attribute is "on". Thus, as shown in FIG. 15, when decoder 216 executes the code corresponding to data element 1505 of DFD 1503, it decodes data field 1529 and invokes inputcallback 1514, which processes the decoded data field 1529 as required for XML element 1527. An input redirection callback is invoked when execution reaches a data element of the DFD whose inputredirection attribute value is "on", just before the encoder encodes the content into binary. Output redirection functions essentially the same way. When data element 1509's outputredirection attribute has the value "on, the callback function is invoked by the encoder after it reads the content of the XML element corresponding to data element 1509.

$$\text{errorbehavior} = \{\ \text{stringExpr}\} \tag{23}$$

The value of the error behavior attribute may be "ignore" (the default), "customize", or "abort". By default, a format handler will try to continue as long as possible and will not abort execution in the presence of an exception such as a missing data field or the violation of a constraint. If however, one supplies an error callback function as shown in FIG. 15, the error callback function will be called when an exception occurs in data format handler 213 at a location corresponding to a data item in DFD 1503 whose errorbehavior attribute has the value "customize". In FIG. 15, that is the case with data component 1507. If the errorbehavior attribute's value is "abort", the format handler stops execution when an exception occurs in data format handler 213 at a location corresponding to the data component in DFD 1503 that contains the errorbehavior attribute.

Data Statements

The body of an element definition (definition 2) may contain one or more data statements. A data statement could be a declare statement, an assignment statement, a data definition, or a comment.

The syntax of a data statement is the following:

$$\begin{aligned}\text{dataStatement} := &(\text{comment} \mid \text{declare} \mid \text{assign} \mid \text{control} \mid \\ &\text{dataDef} \mid \text{elementDef})+\end{aligned} \tag{24}$$

$$\text{comment} := \#\text{characters} \tag{25}$$

A DFDI comment may start anywhere with the character "#" and end with new line. We will describe the syntax of data Defs later.

$$\text{declare} := \text{bit} \mid \text{int} \mid \text{string} \mid \text{bool identifier}; \tag{26}$$

A declare statement introduces a new variable into the data format descriptor. A variable must be declared before it is used in any expression. A declare statement starts with a keyword for the variable's type, which may be "bit" for bit, "int" for integer, "string" for string, or "bool" for Boolean type, followed by an identifier for the variable. The variable identifier must not be a keyword, an attribute tag or a function name. All variables have local scope. The scope of a declared variable is the data item that contains the variable's declaration to and that data item's descendents.

$$\text{assign} := \text{identifier}=\text{expr}; \tag{27}$$

An assignment statement starts with an identifier for the object being assigned to, then the assignment sign "=", followed by an expression, which may be a bit, an integer, a string or a conditional expression. When an expression appears on the right hand side of an assignment statement, the type of the expression's result must match the type of the object represented by the identifier to which the expression is being assigned. If the types do not match, the expression's type must be explicitly cast into the variable's type by an appropriate casting function such as: int2bool, int2string, string2bool, string2int, bool2string or bool2int.

control := ifStatement | whileStatement | switchStatement (28)

There are three types of control statement in the DFD language: if, while and switch. A control statement that contains an expression that resolves to a run-time value introduces dynamic behavior to data format handlers made using DFD, allowing convenient definition of data format handlers where the behavior of the data format handler depends on values in the data object or XML representation being converted by the format handler. The control statements are the following:

ifStatement := if (conditionExpr) {dataStatement}
 [else { dataStatement }; ] (29)

An if statement starts with the keyword "if", followed by a conditional expression enclosed in parentheses and a data statement that will be executed if the conditional expression evaluates to true, and an optional "else" followed by a data statement that will be executed when the conditional expression evaluates to false.

whileStatement := while (conditionExpr) { dataStatement}; (30)

A while statement starts with the keyword "while", followed by a conditional expression in parentheses, and data statements whose execution will be repeated as long as the conditional expression evaluates to true.

switchStatement := switch (identifier) { ( { caseStatement})+[defaultStatement]}; (31)

caseStatement := case expr : { dataStatement
 [break;] } (32)

defaultstatement := default : { dataStatement } (33)

A switch statement starts with the keyword "switch", followed by an identifier, then one or more case statements enclosed by braces and finally an optional default statement. Each case statement starts with the keyword "case", an expression, then data statements to execute if the expression matches the value of the identifier following switch. A case statement may end with an optional keyword "break". The keyword indicates that the case statement does not fall through. The default statement starts with the keyword "default", then data statements to execute if none of the case statements match.

Expressions

For readability, we do not expand the extended BNF definitions in this section to reflect operator precedence. They follow the same precedence rules defined by programming languages such as C or Java.

expr := bitExpr| stringExpr | intExpr | condExpr |
 (expr) (34)

Only bit, integer, string and conditional expression are allowed in DFD. Both identifiers and valid tags may appear in an expression. There are two kinds of expressions involving tags, addressof "@" and valueof "$".

@{stringExpr} (35)

The addressof operator @ is an integer expression that returns a 64-bit integer that is the absolute beginning address, measured in bits from the beginning of the data object, of the field that corresponds to the data item identified by stringExpr. The string expression must evaluate to a valid tag name, otherwise an unrecoverable error will be thrown. If the tag is valid but the data item identified by the tag does not correspond to a field in the data object, which can be the case if the tag is associated with an optional or a declarative data item, then the addressof operator returns −1.

${stringExpr} (36)

The valueof operator $ returns a value of a type corresponding to the type of the field in the data object that corresponds to the tag to which the string expression that evaluates. The expression's return type can only be determined at runtime. The value of any field of the object whose corresponding data item in DFD 203 has a tag and whose type is bit, int, string or Boolean can be returned by the valueof operator. The valueof expression evaluates to the runtime value of the field as determined by the format handler. If the value is not defined (there is no field corresponding to the DFD data item to which the tag belongs and no value attribute), an unrecoverable error will be thrown. In the presence of a callback function, the value returned by $ may be overwritten by the callback function.

bitExpr := identifier | bitConst | bitExpr op bitExpr |
 ${stringExpr} | bitExpr op intExpr | op bitExpr |
 function (37)

A bit expression may be a bit identifier, a bit constant, the binding value of a tag whose data item corresponds to a bit field in a data object, the result of bit operators such as "&" (bitwise and), | bitwise or), ^ (bitwise xor), + (bit concatenate), the result of bit shift operators such as <<or >>, the result of the unary bit operator ~ (bitwise complement), or the result of bit functions or the string2bit cast.

intExpr := identifier | intConst | intExpr op intExpr |
 −intExpr | function | $ {stringExpr } | @
 {stringExpr} (38)

An integer expression can be an integer identifier, an integer constant, the binding value of a tag whose data item corresponds to an integer field in a data object, two integer expressions connected by binary operators "+" plus, "−" minus, "*" times, "/" divides and "%" modulo, one integer expression prefixed by the unary "−" negation operator, the result of an integer function such as strlen, or the value returned by the addressof operator.

stringExpr := identifier | stringConst | stringExpr +
 stringExpr | identifier(intExpr[: [intExpr]]) | $
 {stringExpr} |function (39)

A string expression may be a string identifier, a string constant, the result of the string concatenation operator +, the binding value of a tag whose data item corresponds to a string field in a data object, or may be the result of string casts such as bool2string and int2string. A sub-string expression is a string variable identifier followed by parentheses that encloses one of the following index specifications:

intExpr, an integer expression alone specify a particular character of the string at the particular index, starting from zero for the first character.

intExpr: intExpr, the substring between the two indices, inclusive.

intExpr :, the substring from the index intExpr to the end of the string.

```
condExpr := identifier | condConst | condExpr op
    condExpr | !condExpr | intExpr op intExpr |
    stringExpr op stringExpr |$ { stringExpr } |
    function                                              (40)
```

A conditional expression can be a Boolean identifier, a Boolean constant, the binding value of a tag whose data item corresponds to a string field in a data object, and two integer or two string expressions connected by binary conditional operators: ">" greater than, ">=" greater than or equal to, "<" less than, "<=" less than or equal to, "==" equal to, and "! =" not equal to. Two conditional expressions may be joined by binary logical operators "&&" AND and "||" OR. A conditional expression may also be prefixed with the unary operator "!", logical NOT. In addition the expression may be the result of a Boolean function such as int2bool, string2bool, validtag or strcmp.

An expression may be used in many places where constants are used, for example, in a tag definition, attribute definition or a data type definition. Expressions and control statements combined to introduce dynamic behavior to data format handlers made using DFD, allowing the definition of data structures that are dependent on the values of data components of another part of the document.
{

Mappings of DFDs to XML Representations

As already pointed out, a DFD 203 defines a set of deterministic mappings between data objects having the format described by the DFD and XML representations of the data objects. In the following, rules for these mappings are set forth.

Rule 1: Each Occurrence of a Field in the Data Object that Corresponds to a Primitive Data Def in the DFD Maps to an XML Element with No Child Element in the XML Representation.

A primitive data component definition is the following:

```
dataDefPrime ::= data tag {attr value = {defValue},      (41)
repeat = {repeatNum},                                    (42)
length = {dataLen}; is type};                            (43)
```

Other DFD language attributes do not affect XML mapping, so they are not shown in the above definition. The field corresponding to the above DFD definition can then be mapped to an XML document according to the following XML schema definition:

```
XMLMapping(DataDefPrim) ::=
    <xsd:element name = "tag" maxOccurs = "repeatNum">
        <xsd:complexType>
            <xsd:simpleType base = "xsd:dataType"
                value = "defValue">
            </xsd:simpleType>
        </xsd:complexType>
    </xsd:element>
``` where dataType can be derived unambiguously from the length attribute and the DFD primitive type.

Rule 2: A Data Def that is Empty Maps to an Empty XML Element.

A empty data type definition is the following:

```
dataDefEmpty ::= data tag is null;                       (44)
``` and its XML mapping is:
```
XMLMapping(DataDefEmpty) ::=
    xsd:element name="tag" content="empty"
    </xsd:element
```

Rule 3: A DFD Element Maps to a Complex XML Element.

A DFD element defintion is:

```
elemDef ::= elem elemTag {dataDef 1,
    dataDef 2, . . . , dataDefN}                         (45)
```

The above is the form to which any DFD element definition can be simplified after a data object has been decoded and all control statements have been executed. In this simplified form, each dataDef is a tagged data item which may be a primitive data Def, an empty data Def, a complex data Def, or a cloned data Def. In this simplified form, the element definition can be mapped to a complex XML element, i.e., one that has nested elements, according the following XML schema definition:

```
XMLMapping (elemDef) ::=
    <xsd:element name = "elemTag"
        <xsd: complexType>
            <xsd:element name = "dataTag1" type = "dataTag1">
                XMLMapping(dataDef1)
            </xsd: element>
            <xsd:element name = "dataTag2" type = "dataTag2">
                XMLMapping(dataDef2)
            </xsd: element>
            . . .
            <xsd:element name = "dataTagN" type = "dataTagN">
                XMLMapping(dataDefN)
            </xsd: element>
        </xsd: complexType>
    </xsd:element>
``` where dataTag1 to dataTagN are the corresponding tags for all the data definitions.

Rule 4: Inline Complex Type Definition Maps to a Complex XML Element.

An inline complex data component definition takes the following form:

```
dataDefInline ::= data dataTag {attr repeat = {
    repeatNum}; is elemDef};                             (46)
``` where elemDef is a tagged element definition. Its XML mapping can be described as follows:

```
XMLMapping(dataDefInline) ::=
    <xsd:element name = "dataTag" maxOccurs = "repeatNum">
        <xsd: complexType>
            <xsd:element name = "elemTag" type = "elemTag">
                XMLMapping(elemDef)
            </xsd:element>            </xsd: complexType>
    </xsd:element>
```

Rule 5: A Cloned Element Definition Maps to a Complex XML Element as if the Cloned Element is Inline.

CONCLUSION

The foregoing Detailed Description has disclosed to those skilled in the technologies to which the inventions pertain how to make a data format description that can be used to generate encoders and decoders and how to generate the encoders and decoders from the description. It has further disclosed how a self-describing object may be made from a data object, a representation of the data object, and an encoder-decoder pair that converts between the data object and the representation. Additionally, it has shown how the above techniques can be used to make encoders and decoders that convert between an arbitrary data object and an XML representation of the arbitrary data object without loss of information and how the data object and the XML representation together form a self-describing data object. The Detailed Description has further disclosed the best mode presently known to the inventors of making their data format description, their encoder and decoder generator, and their self-describing objects.

It will be immediately apparent to those skilled in the technologies to which the inventions pertain that there are many ways other than those disclosed herein of practicing the principles of the inventions. For example, the embodiment disclosed herein is implemented in the context of a relational database system, but the techniques can be implemented in many other contexts. Further, though XML is a particularly useful representation of an object, the principles apply to any representation of an object that includes mapping information. In particular, the principles of the invention do not require that the mapping information be hierarchically organized. Additionally, the code generated by the code generator of the preferred embodiment is Java code, but any other code from which ultimately-executable code can be derived is within the principles of the invention.

For all of the foregoing reasons, the Detailed Description is to be regarded as being in all respects exemplary and not restrictive, and the breadth of the invention disclosed here in is to be determined not from the Detailed Description, but rather from the claims as interpreted with the full breadth permitted by the patent laws.

The invention claimed is:

1. In data storage accessible to a processor, a data format description that describes a conversion between a first data object in the storage, the first data object having at least one field, and a second data object in the storage, the second data object having at least one element, the data format description comprising:
   one or more data components, each data component including
      a description of the field and
      mapping information associated with the description,
   a decoder being automatically generated by the processor from the data format description, the decoder, when executed, producing a value from the field and making the element, the element including the value and the mapping information, and/or
   an encoder being automatically generated by the processor from the data format description, the encoder, when executed, using the element's mapping information to locate the field and producing the field from the element's value.

2. The data format description set forth in claim 1 wherein the data component further comprises:
   an attribute that specifies a property of the data component.

3. The data format description set forth in claim 2 wherein:
   the attribute further optionally includes a value specifier, the attribute having the value when the value specifier is present and otherwise having a default value.

4. The data format description set forth in claim 3 wherein:
   the value specifier is an expression whose value is computed during execution of the encoder or decoder.

5. The data format description set forth in claim 4 wherein:
   the expression specifies a value in a field, the location of the field being specified in the expression by the mapping information for the data component corresponding to the field.

6. The data format description set forth in claim 4 wherein:
   the expression specifies an address of a field, the location of the field being specified in the expression by the mapping information for the data component corresponding to the field.

7. The data format description set forth in claim 4 wherein:
   the attribute is a constraint attribute that specifies a constraint on a field value that must be satisfied on decoding or on an element value that must be satisfied on encoding.

8. The data format description set forth in claim 7 wherein:
   failure to satisfy a constraint on encoding or decoding results in an exception being thrown.

9. The data format description set forth in claim 2 wherein:
   the attribute specifies the form of a component of a binary stream that is being written or read by an encoder or decoder.

10. The data format description set forth in claim 2 wherein:
    the attribute specifies the content of a binary stream that is being written or read by an encoder or decoder.

11. The data format description set forth in claim 2 wherein:
    the attribute specifies whether a value from an element corresponding to the data component will be present in the second data object when the second data object is converted from the first data object.

12. The data format description set forth in claim 2 wherein:
    the attribute specifies whether a field corresponding to the data component will be present in the first data object when the first data object is converted from the second data object.

13. The data format description set forth in claim 2 wherein:
    the attribute specifies how the encoder or decoder is to process the field or element in addition to decoding the field or encoding the value from the element.

14. The data format description set forth in claim 13 wherein:
    the attribute specifies whether the field or element is to be skipped.

15. The data format description set forth in claim 13 wherein:
    the attribute specifies what access the encoder or decoder is permitted to have to the field or element.

16. The data format description set forth in claim 13 wherein:
    the attribute specifies a callback to be invoked during processing.

17. The data format description set forth in claim 16 wherein:
the attribute specifies a callback to which the decoded field or encoded element is to be redirected.

18. The data format description set forth in claim 16 wherein:
the attribute specifies a callback which is to be invoked on an error in processing the field or element.

19. The data format description set forth in claim 2 wherein:
in the data component, the description of the field is the mapping information associated with another data component, whereby the data component is given the description of the field and the attribute for the other data component.

20. The data format description set forth in claim 1 further comprising:
a data format description element including
mapping information associated with the data format description element and one or more data components.

21. The data format description set forth in claim 20 wherein the data format description element further comprises:
an attribute that specifies a property of the data components belonging to the data format description element.

22. The data format description set forth in claim 21 wherein:
a data component may also include an attribute; and
an attribute specified in a data component belonging to a data format description element overrides the same attribute as specified in the data format description element containing the data component.

23. The data format description set forth in claim 20 wherein:
in the data component, the description of the field is the mapping information associated with a data format description element.

24. The data format description set forth in claim 23 wherein:
every data component in the data format description is contained in a data format description element;
the mapping information associated with the data format description's data format description elements and data components forms a hierarchy; and
in the hierarchy, each item of mapping information is unique when qualified by the items of mapping information that are its ancestors in the hierarchy.

25. The data format description set forth in claim 24 wherein:
a plurality of the data format descriptions are simultaneously visible to the encoders or decoders produced from the data format descriptions; and
the top level mapping information in each of the simultaneously visible data format descriptions is unique.

26. The data format description set forth in claim 20 wherein:
every data component in the data format description is contained in a data format description element;
the data format description element and the contained data components form a hierarchy;
the second object is an XML representation;
the hierarchy corresponds to a hierarchy of XML elements in the XML representation; and
each element in the hierarchy of XML elements has the mapping information of its corresponding data format description element or data component as its XML element name.

27. The data format description set forth in claim 1 wherein the data format description further comprises:
a control statement that determines an order in which the encoder or decoder performs the encoding or decoding operations specified by the data components, the order being determined by the control statement in response to an expression whose value is computed during execution of the encoder or decoder.

28. Apparatus that generates an encoder and/or a decoder that converts between a first data object having at least one field and a second data object having at least one element, the apparatus including a processor and data storage accessible thereto and being characterized in that:
the processor generates the encoder and/or the decoder in the data storage in response to a data format description in the data storage that includes
a description of the field and
mapping information associated with the description,
the decoder, when executed by the processor, producing a value from the field and making the element, the element including the value and the mapping information, and the encoder, when executed by the processor, using the element's mapping information to locate the field and producing the field from the value.

29. The generating apparatus set forth in claim 28 further characterized in that:
an execution of a generated encoder or decoder may have a callback associated therewith; and
the data format description further includes an attribute that specifies whether the encoder or decoder is permitted to invoke the callback while processing the field or element.

30. The generating apparatus set forth in claim 28 further characterized in that:
the decoder converts the field in the data object to the element in the representation without loss of information belonging to the field; and
the encoder converts the element in the representation to the field without loss of information belonging to the field.

31. The generating apparatus set forth in claim 28 further characterized in that:
the second object is an XML object and the mapping information is an XML element name that is employed in the encoder and the decoder to map the field in the data object to a corresponding element in the XML object.

32. A self-describing data object in data storage accessible to a processor, the self-describing data object comprising:
the data object;
a representation of the data object that includes mapping information that establishes a mapping between the data object and the representation;
a decoder that, when executed by the processor, produces the representation from the data object; and
an encoder that, when executed by the processor, uses the mapping information to produce the data object from the representation,
the representation, the decoder, and the encoder all being associated with the data object in the data storage, and the processor responding to a modification of the representation by executing the encoder to modify the data object.

33. The self-describing data object set forth in claim 32 wherein:
- the data object includes one or more fields; and
- the decoder converts a given field in the data object to a corresponding element in the representation without loss of information belonging to the field; and
- the encoder converts a given element in the representation to the corresponding field without loss of information belonging to the field.

34. The self-describing data object set forth in claim 32 wherein:
- the representation is an XML object and the mapping information is an XML element name that is employed in the encoder and the decoder to map a field in the data object to an element in the XML object.

* * * * *